(12) United States Patent
Noack

(10) Patent No.: US 9,940,416 B2
(45) Date of Patent: Apr. 10, 2018

(54) TWO-SCALE METHOD USING A LIST OF ACTIVE SUB-DOMAINS FOR A FULLY PARALLELIZED SOLUTION OF WAVE EQUATIONS

(71) Applicant: SIMULA INNOVATION AS, Lysaker (NO)

(72) Inventor: Marcus Noack, Snaroya (NO)

(73) Assignee: SIMULA INNOVATION AS, Lysaker (NO)

(*) Notice: Subject to any disclaimer, the term of this patent is extended or adjusted under 35 U.S.C. 154(b) by 99 days.

(21) Appl. No.: 15/159,329

(22) Filed: May 19, 2016

(65) Prior Publication Data

US 2016/0343105 A1 Nov. 24, 2016

Related U.S. Application Data

(60) Provisional application No. 62/163,713, filed on May 19, 2015.

(51) Int. Cl.
*G06F 15/16* (2006.01)
*G06F 17/50* (2006.01)
*G06F 9/50* (2006.01)

(52) U.S. Cl.
CPC ........ *G06F 17/5018* (2013.01); *G06F 9/5044* (2013.01); *G06F 2217/16* (2013.01)

(58) Field of Classification Search
None
See application file for complete search history.

(56) References Cited

U.S. PATENT DOCUMENTS

2012/0263016 A1* 10/2012 Shin .................. G01V 1/30
367/73
2016/0178801 A1* 6/2016 Bobrek .............. G01V 99/005
703/2

OTHER PUBLICATIONS

Craig J. Webb "Parallel computation techniques for virtual acoustis and physical modelling synthesis", Doctor of Philosophy Acoustics and Audio Group University of Edinburgh, 2014, all pages.*

* cited by examiner

*Primary Examiner* — Frank Chen
(74) *Attorney, Agent, or Firm* — Oblon, McClelland, Maier & Neustadt, L.L.P.

(57) ABSTRACT

Described herein is an apparatus and method for allocating hardware-based processing units for a wave modeling computation. The method generates a computational domain representing a physical region in which wave amplitudes for physical waves are determined. The domain is divided into a plurality of sub-domains, whereafter the method determines which sub-domains of the plurality of sub-domains are active. Further, the method, for each computational step of a plurality of computational steps and in each active sub-domain, executes a first portion of the wave modeling computation corresponding to the active sub-domain by at least one available hardware-based processing unit and determines whether the active sub-domain will remain active in a next computational step of the plurality of computational steps. When the active sub-domain is determined to become inactive in the next computational step, the method allocates the at least one available hardware-based processing unit to other computational tasks.

20 Claims, 20 Drawing Sheets
(10 of 20 Drawing Sheet(s) Filed in Color)

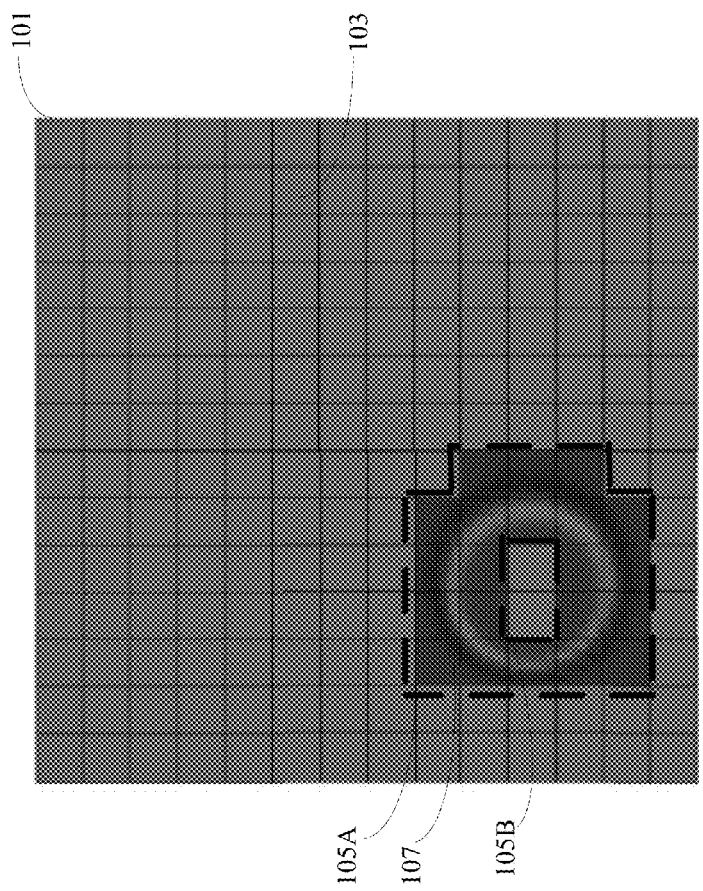

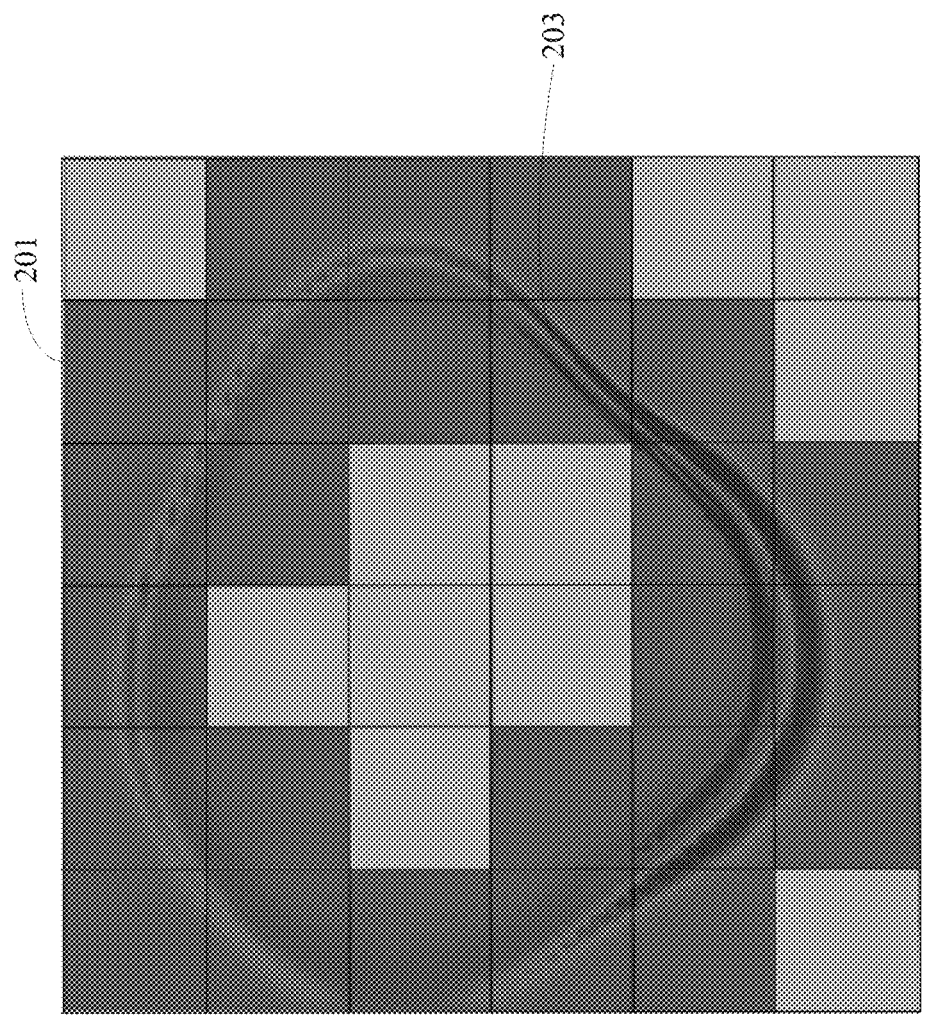

TWO-SCALE METHOD USING A LIST OF ACTIVE SUB-DOMAINS FOR A FULLY PARALLELIZED SOLUTION OF WAVE EQUATIONS

CROSS-REFERENCE TO RELATED APPLICATIONS

This application is based upon and claims the benefit of priority to provisional U.S. Application No. 62/163,713, filed May 19, 2015, the entire contents of which are incorporated herein by reference.

BACKGROUND

Field of Disclosure

The present disclosure relates generally to a method of obtaining a fully parallelized solution of wave equations. More specifically, the present disclosure relates to a framework of achieving efficient utilization of multi-GPU computer architectures.

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wave propagation plays a central role in many fields such as physics, environmental research, medical imaging, acoustics modeling, solid state physics, seismic imaging and cardiac modeling. Different methods have been proposed for obtaining stable and accurate solutions of the wave equation. However, computational cost remains a major problem for most applications.

The most commonly used methods to solve the wave equation can be divided into finite-element methods, spectral element methods, and explicit and implicit finite difference methods. The finite difference method is especially suitable for graphical processing unit (GPU) acceleration, due to the simple division into independent operations. In such methods, the solution in a current time step depends only on solutions of the previous time step. Hence, all nodes can be computed in parallel. However, the numerical solution of the wave equation is a memory-demanding process since desired frequencies, model sizes, and wave velocities impose large grid sizes. Specifically, due to a limited amount of global memory that current GPUs are equipped with, most large scale applications require multiple GPUs to be deployed.

In applications such as those in the field of acoustics, where the model size rarely exceeds 100 meters and there is a desire to incorporate a large number of frequencies, a grid size of typically 22e6 nodes is required. Further, in seismic imaging applications where the model dimensions are often in the order of a few hundred kilometers in lateral and vertical extension, minimal wave velocities of 300 m/s and frequencies of 10 Hz impose a grid size requirement of approximately 16e9 nodes.

However, current GPUs have a maximum global memory of six gigabytes, and can therefore store around 1.6e9 single precision floating point numbers. Furthermore, the global memory of the GPU must store more that just the resulting array of frequencies. A typical solution to this problem is to distribute the workload and data to different GPUs. Specifically, one GPU is assigned to one specific sub-domain. This approach however tends to be inefficient as most GPUs remain idle during a large computation period. Accordingly, there is a requirement for a framework that achieves efficient utilization of multi-GPU architectures.

SUMMARY

An aspect of the present disclosure provides for a mechanism to distribute the workload and data efficiently on different GPUs by activating sub-domains in which a wave exhibits amplitudes larger than a given threshold and adding these sub-domains to a list. Further, only the sub-domains in the list are distributed over available GPUs. During the computation at the sub-domain level, each GPU determines whether the computed sub-domain needs to be active, and based on the determination, designates the domain for computation if the wave has traveled into the domain boundaries. In such a fashion, the effective problem size may be decreased by orders of magnitude depending on the problem itself and the computing capacities.

Additionally, the technique described in the present disclosure is able to decrease the demands of computing resources for a given desired computational performance, since it avoids idle GPUs. In case of having an abundant number of GPUs, the method according to an embodiment of the present disclosure provisions for an increase in the number of sub-domains, and hence improves the accuracy of the solution. Furthermore, including more sub-domains also provides the advantageous ability of isolating active regions from the inactive regions, and therefore increases the computation performance.

An aspect of the present disclosure provides for a method for allocating hardware-based processing units for a wave modeling computation, comprising: generating a computational domain representing a physical region in which wave amplitudes for physical waves are determined; dividing the domain into a plurality of sub-domains; determining which sub-domains of the plurality of sub-domains are active; for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, when the active sub-domain is determined to become inactive in the next computational step, allocating the at least one available hardware-based processing unit to other computational tasks.

An aspect of the present disclosure provides for an apparatus for allocating hardware-based processing units for a wave modeling computation, comprising: circuitry configured to generate a computational domain representing a physical region in which wave amplitudes for physical waves are determined; divide the domain into a plurality of sub-domains; determine which sub-domains of the plurality of sub-domains are active; for a computational step of a plurality of computational steps and in each active sub-domain of the plurality of active sub-domains, execute a first portion of the wave modeling computation corresponding to the active sub-domain by at least one available hardware-based processing unit and determine whether the active sub-domain will remain active in a next computational step of the plurality of computational steps, when the active sub-domain is determined to become inactive in the next computational step, allocate the at least one available hardware-based processing unit to other computational tasks.

A further aspect of the present disclosure provides for a non-transitory computer readable medium storing thereon instructions that when executed by a computer cause the computer to execute a method for allocating hardware-based processing units for a wave modeling computation, the method comprising: generating a computational domain representing a physical region in which wave amplitudes for physical waves are determined; dividing the domain into a plurality of sub-domains; determining which sub-domains of the plurality of sub-domains are active; for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, when the active sub-domain is determined to become inactive in the next computational step, allocating the at least one available hardware-based processing unit to other computational tasks.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Various embodiments of this disclosure that are proposed as examples will be described in detail with reference to the following figures, wherein like numerals reference like elements, and wherein:

FIG. 1 illustrates according to an embodiment, an exemplary snapshot of a wave propagating in a domain;

FIG. 2A and FIG. 2B illustrate exemplary effective problem sizes as compared to actual problem sizes for two cases of wave modeling;

DETAILED DESCRIPTION OF EMBODIMENTS

Figure 2B:
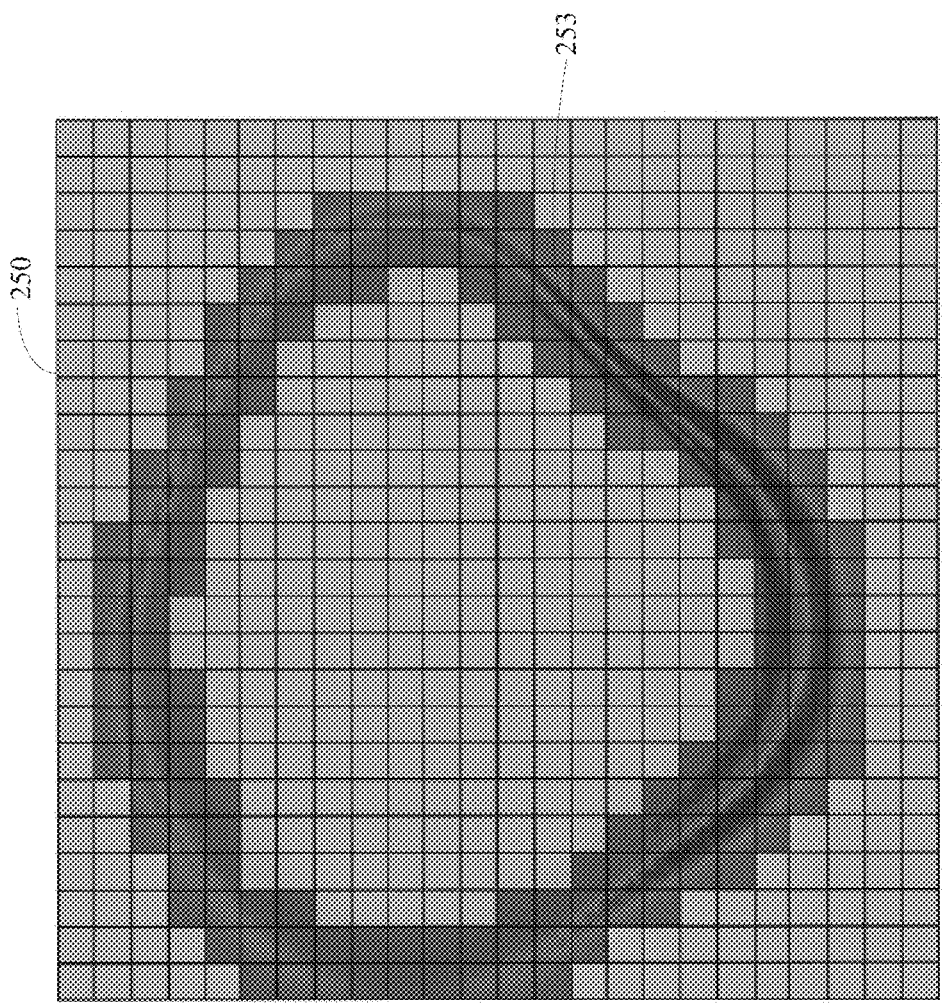

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

According to one embodiment of the present disclosure, a list of sub-domains is generated, wherein a certain sub-domain (also referred to herein as a node) is activated only if the amplitude of the wave inside the sub-domain is higher than a predetermined threshold. The concept of a list of sub-domains is described by Gillberg et al. in "Parallel solutions of static Hamilton-Jacobi equations for simulations of geological folds", Journal of Mathematics in Industry 4 (1) (2014) 10, which is incorporated herein by reference in its entirety. Gillberg describes a technique of simulating geological folds by solving a static Hamilton-Jacobi equation.

Note that the solution process for solving static Hamilton-Jacobi equation, as described by Gillberg is very different from solution process of the wave equation of the present disclosure. The main differences are in the dimensionality of the problem, the solution process on sub-domain level e.g. the required stencil shapes, and the desired employment of multi-GPU computer architecture.

Specifically, the solution of a static Hamilton-Jacobi equation (as described by Gillberg) is found by a fast sweeping method on sub-domain level, which sweeps until convergence to find a viscosity solution. In order to parallelize the solution process, a pyramid-shaped stencil is used to compute nodes of an entire plane independently. However, it must be appreciated that different stencil shapes require different ghost node configurations and therefore different communication schemes. Since the solution of the wave equation is not an iterative process that needs to converge to a minimum, the activation patterns for sub-domains and the solution process on the sub-domain level as described by embodiments of the present disclosure are very different than those described by Gillberg. Additionally, the method of Gillberg is not developed to be implemented on multi-GPU computer architecture. Rather, the method of Gillberg is applicable only to solve problems wherein a strongly bent characteristic curve of the static Hamilton-Jacobi equation occurs.

For sake of simplicity, the method as described by embodiments of the present disclosure is explained with reference to an acoustic wave equation implementation. However, it must be appreciated that the techniques as described herein can be adapted to more complicated scenarios. Additionally, by an embodiment of the present disclosure, a scope of the method is targeted towards multi-GPU computer architecture. However, note that a single GPU may be divided into an independent number of portions in order to simulate a GPU cluster. Accordingly, the duality provisions the method of the present disclosure are equally applicable on any parallel computer architecture.

Turning now to FIG. 1, there is illustrated according to an embodiment, a snapshot of a propagating wave. As shown in FIG. 1, a domain 101 is divided into a plurality of sub-domains 103, for instance, the domain 101 of FIG. 1 has a rectangular grid-like shape and includes 196 sub-domains. The propagative wave has amplitude depicted as 107 in FIG. 1. Note that, at the time instant corresponding to the snapshot of FIG. 1, only a certain portion of the sub-domains are active. Specifically, as shown in FIG. 1, only the twenty one dark-shaded sub-domains that lie within the dashed lines 105A and 105B are active. Thus, as described in the following embodiments, only the required twenty one sub-domains are activated in the computation process at the next time step.

In contrast, in the traditional approach of wave modeling, one GPU is respectively assigned to each of the sub-domains. Thus, for the scenario as depicted in FIG. 1, for the traditional approach of wave modeling, 89% of the GPUs are running idle i.e., the GPUs are activated but do not process any meaningful data at the current time step. Accordingly, as described next, the wave modeling framework of the present disclosure activates only the required number of sub-domains and thereby achieves processing efficiency.

By one embodiment of the present disclosure, the method of allocating GPUs to sub-domains is able to decrease the demands of computing resources for a desired computational performance, since it avoids idle GPUs. In case of having an abundant number of GPUs, the method provisions for an increase in the number of sub-domains, and thus improves the accuracy of the solution. More sub-domains also offers a more accurate isolation of active from inactive regions, and therefore increases the overall efficiency.

FIG. 2A and FIG. 2B illustrate an effective problem size as compared to an actual problem size for two cases of wave modeling, respectively. FIG. 2A depicts a domain 201 including a total of 36 sub-domains. Furthermore, the snapshot of FIG. 2A depicts a wave 203 propagating through the domain 201. As shown in FIG. 2A, the ratio of sub-domains to active domains (twenty five) is 1.44. Specifically, the active domains in FIG. 2A are represented by a darker shade.

FIG. 2B depicts the same problem as that of FIG. 2A. However, in FIG. 2B the domain 250 is divided into a total of 576 sub-domains. The wave propagating through the domain 250 is depicted as 253. The ratio of sub-domains to active sub-domains in this case is 3.81. The exemplary example as depicted in FIG. 2B illustrates the computation cost benefits from more sub-domains since active regions can be separated from non-active regions in a more accurate fashion. Specifically, enhancing the resolution of the domain leads to an accurate mechanism of identifying active sub-domains. It must be noted that the sub-domains must be large enough so as to fully utilize the GPU. Furthermore, in case of having an abundant number of GPUs, the resolution of the domain can (and should be) enlarged in order to utilize all of the GPUs in an optimal manner.

According to an embodiment of the present disclosure there is described a method for allocating hardware-based processing units (GPUs) for a wave modeling computation. A goal of the method is to solve the following wave equation on large grid sizes as efficiently as possible:

$$\frac{\partial^2 u(x,t)}{\partial t^2} = c(x)^2 \nabla^2 u(x,t) \tag{1}$$

$$u(x,0) = f(x)$$

$$\frac{\partial u(x,0)}{\partial t} = 0,$$

where u(x) is a scalar function, c(x) is the wave velocity at point x, and $\nabla^2$ is a Laplacian operator. In order to solve equation (1) with the help of an explicit finite difference scheme, it is necessary to derive the finite difference approximation for the wave equation, given by:

$$u_{ijk}^{t+1} = v_{ijk}^2 dt^2 \nabla^2 u + 2u_{ijk}^t - u_{ijk}^{t-1}. \tag{2}$$

Note that all nodes in time step t+1 are independent of all other nodes in the same time step. Thus, all computational values depend only on the values of previous time steps. Accordingly, the process of allocating GPUs to the nodes of the present disclosure exhibits abundant parallelization. Time flows at a constant rate, and thus the computed wave field $u(x)^{t+1}$ will, in the next time step, be the required $u(x)^t$, and $u(x)^t$ will be $u(x)^{t-1}$. Therefore, provided that the computation takes place only on one GPU, data only has to be copied to the device in the initialization step. Moreover, this advantageous ability is preserved in the case of multi-GPU computation. Specifically, by one embodiment, the process performs a query to determine whether GPUs (i.e. processing units or processing devices) and the data set on the global memory (of the GPUs) can be reused. If the response to the query is affirmative, pointers are redirected one time step to the past, and thus no copying of new data is necessary, as long as no new sub-domain is activated.

By one embodiment, in order to guarantee the possibility of a correctly working communication mechanism between the subdomains, and further to eliminate the need for communication during the computation, the incorporation of a sufficient amount of ghost nodes (defined herein as copies of nodes in adjacent domains, and described later with reference to FIG. 4) around each sub-domain is necessary. Further, for accuracy reasons, in the approach of wave modeling of the present disclosure, a central finite difference scheme of fourth order is implemented to obtain the second derivatives of the Laplacian as follows:

$$\left.\frac{\partial^2 u}{\partial x^2}\right|_{x_i} \approx \frac{-u_{i+2} + 16u_{i+1} - 30u_i + 16u_{i-1} + u_{u_2}}{12\Delta x_i}. \quad (3)$$

Figure 3:
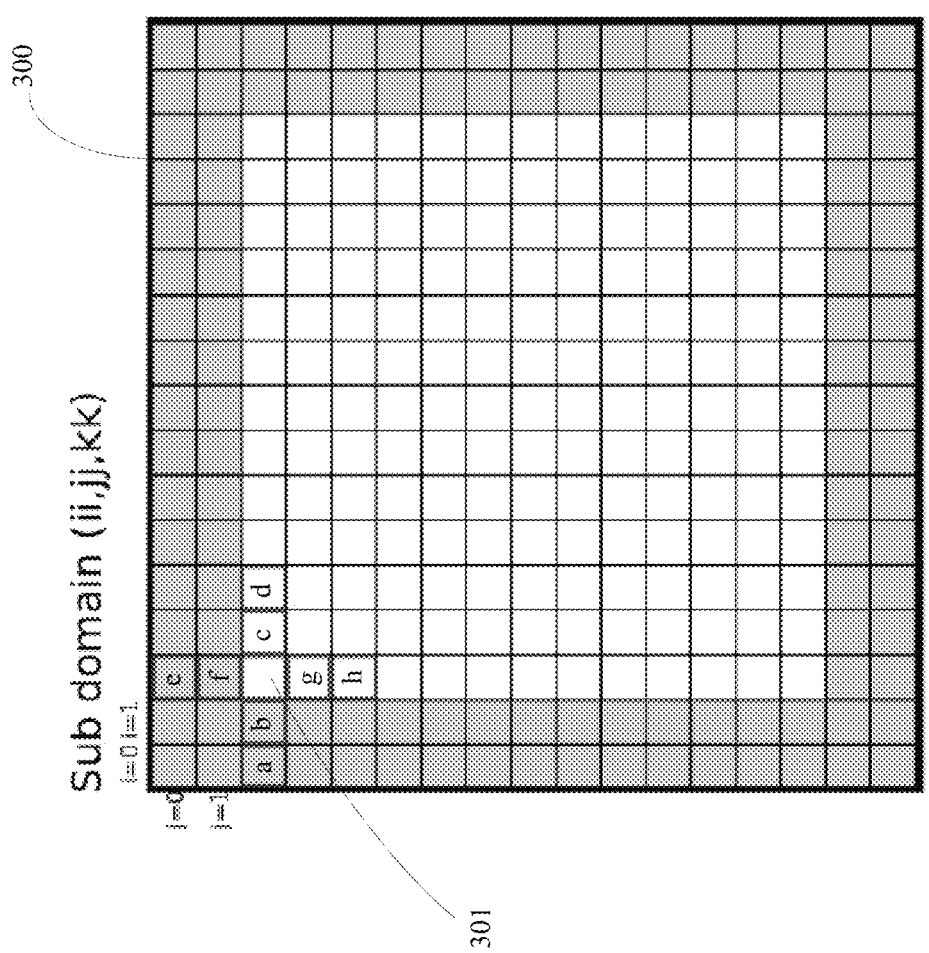
FIG. 3 depicts an exemplary domain setting according to one embodiment.

Turning to FIG. 3, there is depicted an exemplary setting of a domain 300. Note that whether one is performing computations on a CPU or on one GPU, equation (3) requires the domain setting as illustrated in FIG. 3. Further, FIG. 3 illustrates a Laplacian stencil (computed at each time step) for the sub-domain 301. The Laplacian stencil for sub-domain 301 includes the sub-domains labelled 'a'-'h' that surround the sub-domain 301. Thus, due to the spatial extent of the Laplacian stencil, two layers of nodes that are represented in FIG. 3 by a dark shade, and which lie on the periphery of the domain 300, cannot be computed.

The communication between the sub-domains works with the same (sub-) domain setting. Therefore, the sub-domains for the multi-GPU computations are padded by two ghost node layers at each side as illustrated in FIG. 4. Furthermore, by one embodiment, the use of different stencil shapes for the computation of the Laplacian requires the adjustment of the ghost node configuration.

Figure 4:
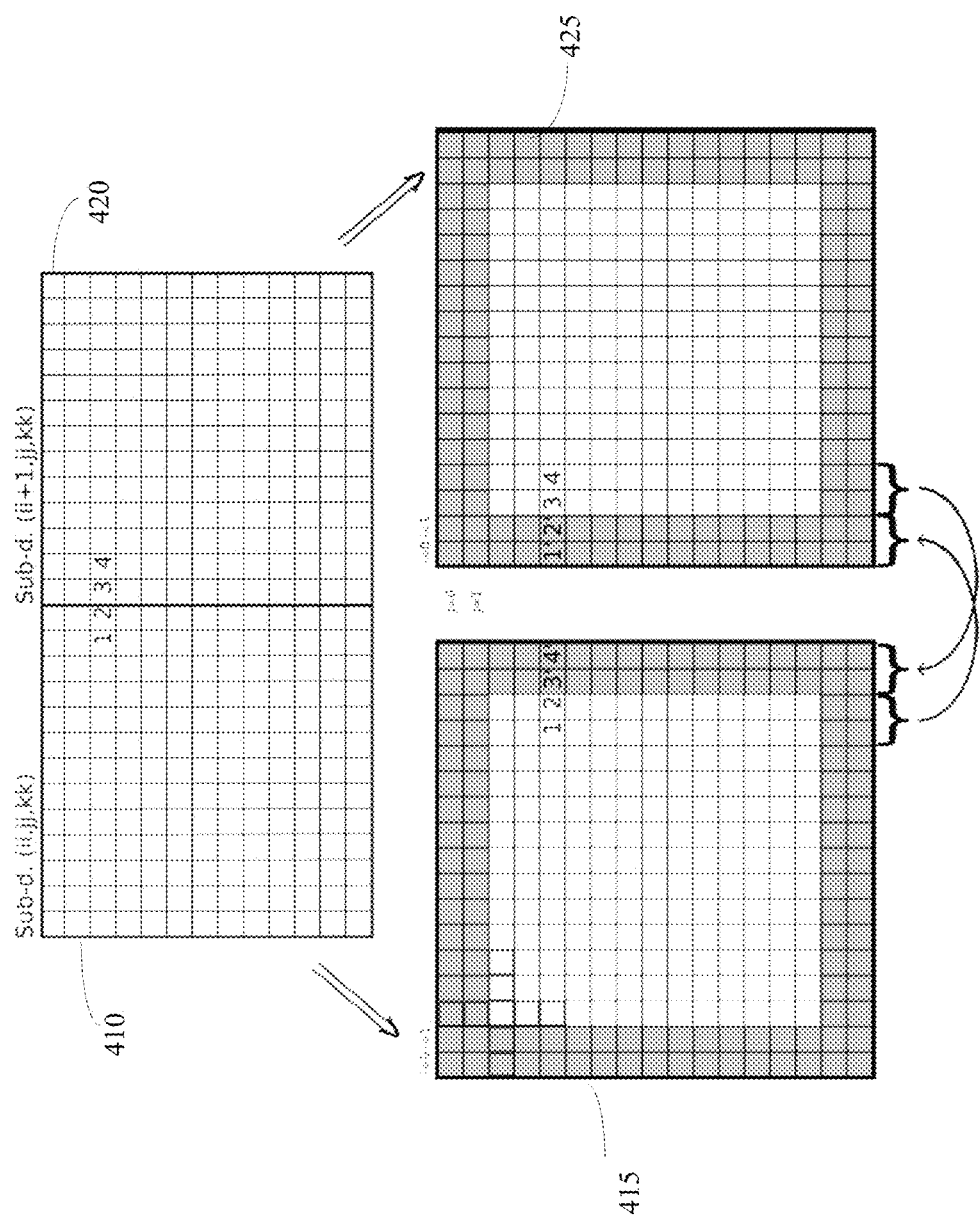
FIG. 4 illustrates according to an embodiment, the generation of ghost-node layers.

FIG. 4 illustrates, according to an embodiment, the generation of ghost-node layers. As shown in FIG. 4, for the purpose of achieving an efficient communication, the sub-domains 410 and 420 are surrounded by two layers of ghost nodes in accordance with the extent of the Laplacian stencil. Referring to domains 415 and 425, ghost nodes (represented as 'X') are copies of the corresponding node (X). During a synchronization phase (described later), the values of nodes represented as '1' and '2' are first copied to the corresponding nodes, based on the respective values being greater than a predetermined threshold. Further, the values of nodes '3' and '4' are copied to the corresponding locations, in the case of having sufficiently large wave amplitude values. Note that the sub-domain is activated if at least one node in the sub-domain gets a newly assigned value.

Figure 5:
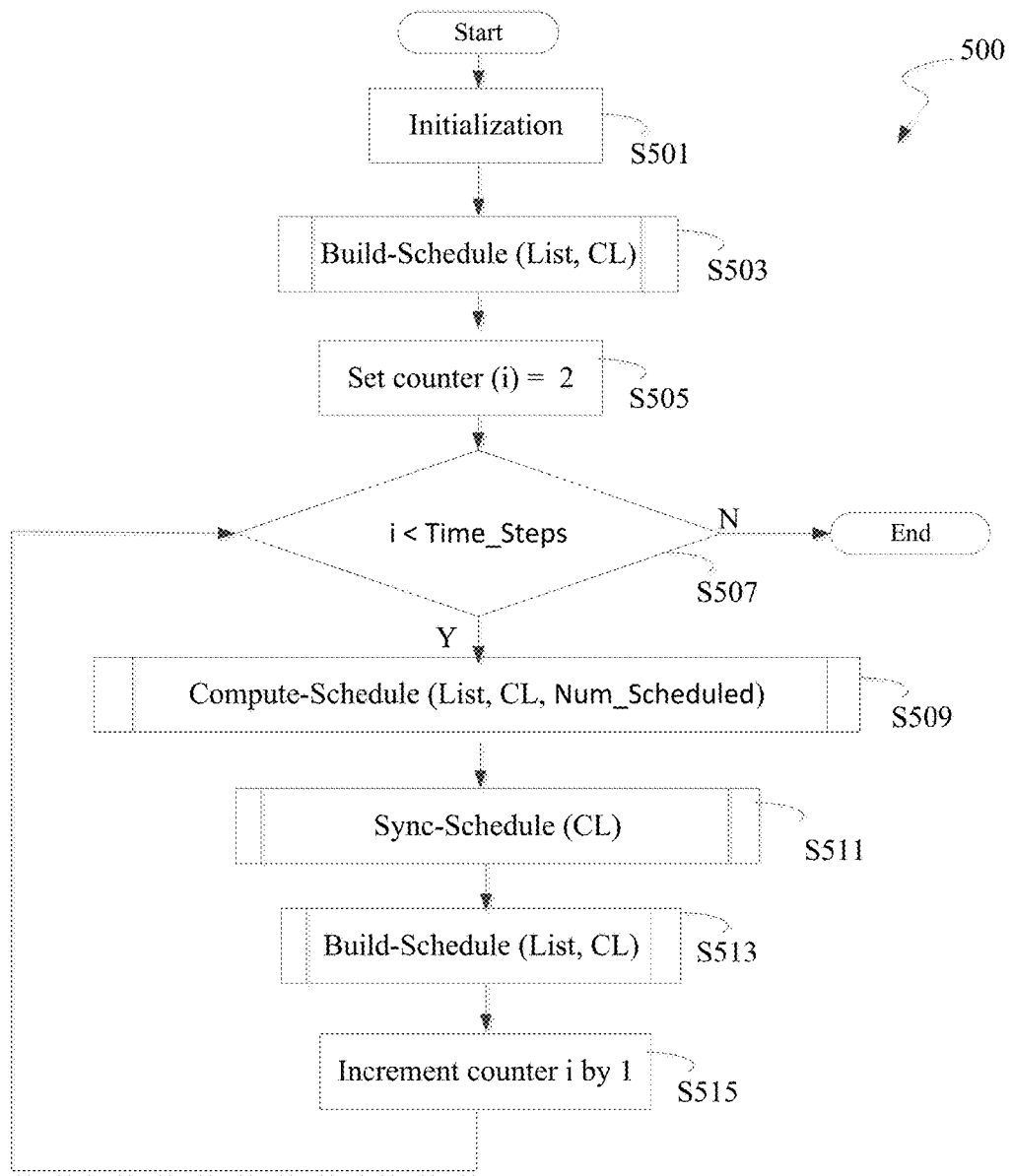
FIG. 5 depicts according to an embodiment, a flowchart illustrating a top level implementation of the process of allocating hardware-based processing units (GPUs) for a wave modeling computation.

FIG. 5 depicts, according to an embodiment, a flowchart 500 illustrating a top level implementation of the process of allocating hardware-based processing units (GPUs) for a wave modeling computation.

The process as depicted in FIG. 5 iterates over all time-steps, wherein at each time-step the process computes all tasks of the current schedule, synchronizes the sub-domains, and builds a new schedule. For sake of illustration, the number of sub-domains is denoted by $s_x$, $s_y$ and $s_z$, respectively. The size of a sub-domain is denoted by $b_x$, $b_y$, and $b_z$, respectively. The wave field array and the velocity array are stored by sub-domain. Thus, the velocity array is a four dimensional array, wherein the first three dimensions describe the sub-domain (ii; jj; kk) and the last dimension represents a flattened array that describes the position in the sub-domain $((i*(b_y+4)*(b_z+4))+(j*(b_z+4))+(k))$, where the value '4' originates from the ghost node layers as shown in FIG. 3. Note that the wave array is handled in a similar manner with an additional time dimension. Accordingly, by one embodiment, the wave array is a five dimensional array represented as: (u(timestep; ii; jj; kk; position in sub domain)).

Turning to FIG. 5, in the initialization step (step S501), the wave field is defined for the first two time steps in accordance to equation (1). If a node has a value assigned larger than a given threshold then the corresponding sub-domain is activated.

In step S503, a schedule is built based on the activated sub-domains. Specifically, activating a subdomain corresponds to assigning a value 'true' to a corresponding entry in a boolean array (represented as CL). Further, the coordinates of the sub-domains (denoted by ii; jj; kk) are written into a LIST. The LIST operates as a schedule for the next computation iteration. The sub-domains in the list are referred to as tasks. In each time step the available GPUs are optimally assigned to the tasks in the schedule, considering the least necessary data transfer (as described later with reference to FIG. 10).

The process further proceeds to step S505 wherein a value of a counter i is set to 2.

Further, in step S507, a query is made to determine whether the value of the counter is less than a predetermined number of time steps. If the response to the query is affirmative, the process proceeds to step S509. However, if the response to the query is negative (indicating that the predetermined number of time step computations have been performed), the process terminates.

In step S509, the process computes a schedule, whereafter in step S511, the process synchronizes the sub-domains and further, in step S513, the process performs the operation of building the schedule. Each of the processes of steps S509, S511, and S513 are described next with reference to FIGS. 6-9, respectively. It must be appreciated that the computation on the sub-domain level and synchronizing process may change the activation of sub-domains. Hence, it is important to build a new schedule (S513) after each iteration of the computation and synchronization process.

The process further proceeds to step S515, wherein the value of the counter i is incremented by one. Thereafter the process, based on the value of the counter i, either terminates or repeats the process in steps S509-S515 as shown in FIG. 5.

Figure 6:
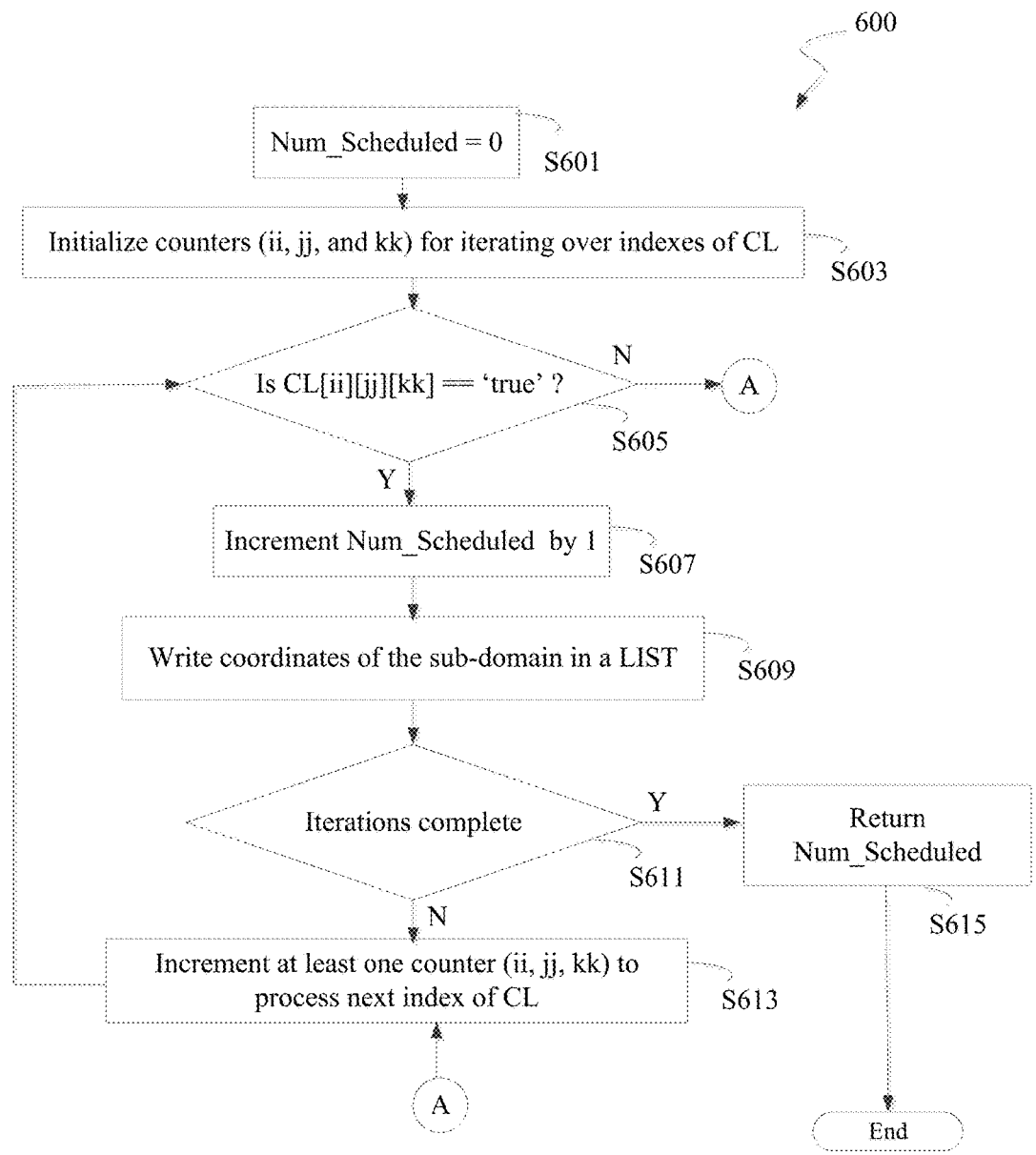
FIG. 6 depicts an exemplary flowchart illustrating the steps performed in building a schedule.

FIG. 6 depicts an exemplary flowchart 600 illustrating the steps performed in building a schedule.

In step S601, a parameter corresponding to the number of scheduled sub-domains (referred to herein as Num_Scheduled) is initialized to zero.

In step S603, counters ii, jj, and kk for iterating over indexes of the boolean array CL are initialized to zero.

The process in step S605 performs a query to determine whether entry at CL[ii][jj][kk] is assigned a 'true' value. If the response to the query is affirmative, the process proceeds to step S607. If the response to the query is negative, the process proceeds to step S613.

In step S607, the value of the counter Num_Scheduled is incremented by one.

The process further proceeds to step S609, wherein the coordinates of the sub-domain (i.e., ii, jj, kk) are written into the LIST.

The process thereafter moves to step S611, wherein a query is made to determine if the iterations over all indexes of the Boolean array CL are performed. If the response to the query is negative, the process proceeds to step S613, else if the response is affirmative, the process proceeds to step S615.

In step S613, the value of at least one counter ii, jj, kk is incremented in order to process the next index of the Boolean array CL. For instance by one embodiment, a 3-dimensional nested loop, wherein the counters ii, jj, and kk iterate over their respective lengths $s_x$, $s_y$, and $s_z$, may be utilized to ensure that all indexes of CL are processed. The process thereafter loops back to step S605 to repeat the process for the next index of CL.

If the response to the query in S611 is affirmative, thereby corresponding to the case that all indexes of array CL have processed, the process moves to step S615, wherein the build schedule process of FIG. 6 returns a value, e.g. via the parameter Num_Scheduled, to the process of FIG. 5. Thereafter the process of FIG. 6 terminates.

Figure 7:
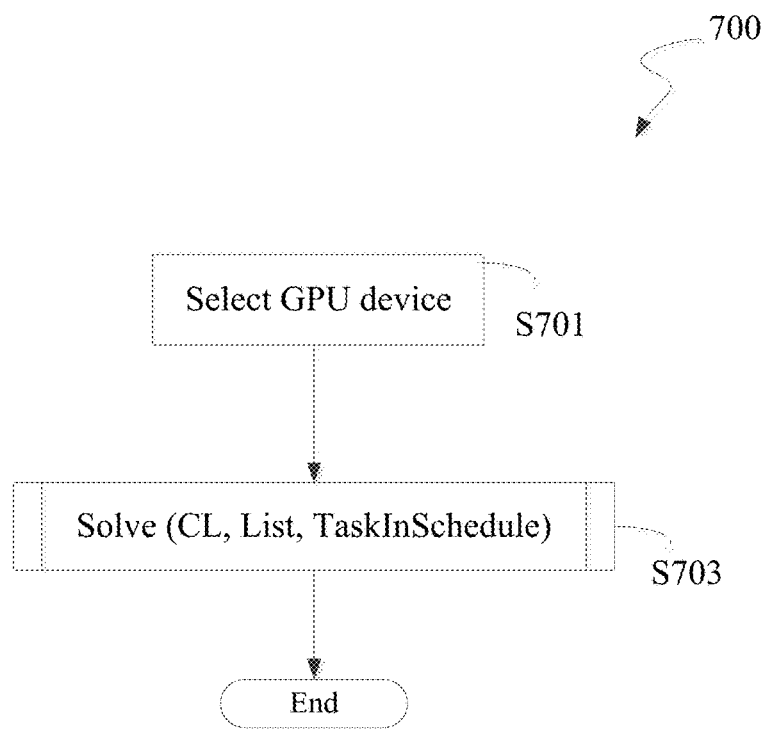
FIG. 7 depicts an exemplary flowchart illustrating the steps performed in computing a schedule.

FIG. 7 depicts an exemplary flowchart 700 illustrating the steps performed in computing a schedule. After a LIST containing the schedule is built (by the process of FIG. 6), every available GPU is assigned a task from the schedule. By one embodiment, one task is assigned to one sub-domain. The corresponding sub-domains are copied to the different devices, where the next time step is computed in parallel. Note that, if a GPU is active a second time step in a row, data is not transferred again but reused to save computing time.

During computation, each GPU checks if at least one node in the sub-domain gets assigned an amplitude that is larger than a given threshold. If not, the corresponding GPU informs the host that the sub-domain may be de-activated. Since several sub-domains are computed simultaneously and the computation on the sub-domain level is in parallel, the method of the present disclosure exhibits a two-level parallelization.

Specifically, the steps outlined in FIG. 7 are performed for each task in the schedule. In step S701, a GPU is selected for a particular task under consideration. Further the process in step S703 executes a solve function to perform the task associated with the sub-domain. Details regarding the solve function are described next with reference to FIG. 8.

Figure 8:
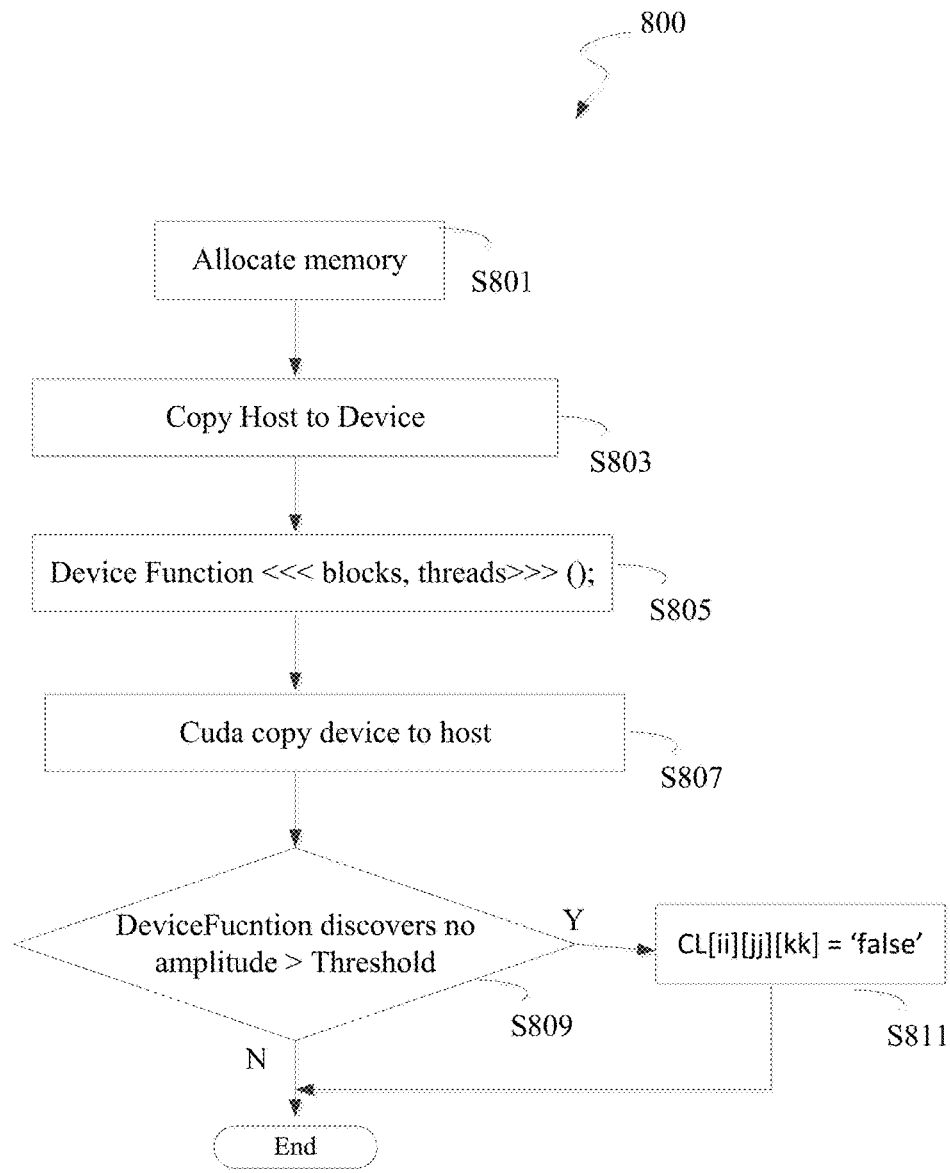
FIG. 8 depicts a flowchart according to an embodiment, illustrating the steps performed in solving a particular task of a sub-domain.

FIG. 8 depicts an exemplary flowchart 800, according to an embodiment, illustrating the steps performed in solving a particular task of a sub-domain. For sake of convenience, the steps in FIG. 8 are described with respect to CUDA, which is a type of parallel computing platform and application programming interface (API) that enables users to use a CUDA-enabled graphics processing unit (GPU) for general purpose processing. However, it must be appreciated that any other parallel computing platform is well within the realm of the present disclosure.

In step S801, memory is allocated to the sub-domain whose tasks are to be computed. Further, in step S803, a standard CUDA instruction of transferring data from host to device is executed. The process in step S805 sets the number of blocks and threads in calling a device function of CUDA. The process then proceeds to step S807, wherein the data is transferred from the device back to the host. Further, in step S809, a query is made to determine whether the called device function finds an amplitude, in the sub-domains, which is not greater than the predetermined threshold. If the response to the query is affirmative, the process proceeds to step S811, wherein the corresponding entry in the Boolean array indexed by position CL[ii][jj][kk] is set to 'false'. If the response to the query in step S809 is negative, the process of FIG. 8 terminates.

Figure 9:
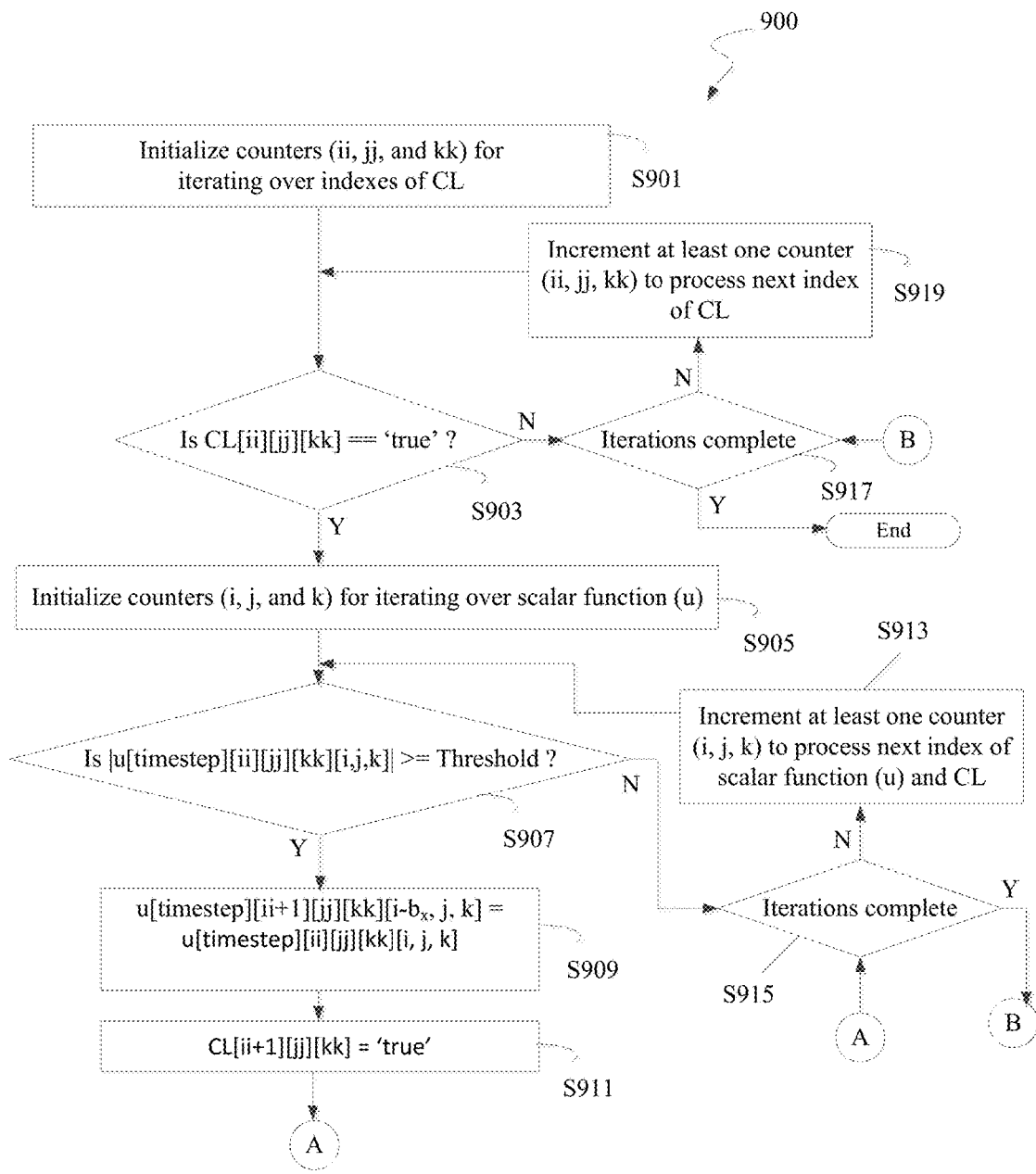
FIG. 9 illustrates a flowchart according to an embodiment, depicting the steps performed in synchronization and activation of sub-domains.

FIG. 9 illustrates a flowchart 900 depicting the steps performed in synchronization and activation of sub-domains. For sake of convenience, the flowchart of FIG. 9 illustrates synchronization in the positive x-direction. After the computation of one time step, all sub-domains need to be synchronized. By one embodiment, in order to achieve the synchronization, all ghost nodes are copied to their corresponding position in the adjacent sub-domain. This process is implemented one direction at a time in order to avoid memory interference. As described next with reference to the steps of FIG. 9, a ghost node is only copied to its corresponding position in the adjacent sub-domain if its value is larger than a given threshold. If a value of a node is copied to the adjacent sub-domain, this sub-domain is activated for the computation of the next time step. By one embodiment, an 'if' condition ensures that only the sub-domains that were active in the last time step are synchronized in order to reduce computational costs.

Referring to FIG. 9, in step S901, counters ii, jj, and kk for iterating over indexes of the boolean array CL, are initialized to zero. The process then proceeds to step S903, wherein a query is made to determine whether the value in the boolean array CL, at position CL[ii][jj][kk], is 'true'. If the response to the query is affirmative, the process proceeds to step S905. However, if the query is negative, the process moves to step S917.

In step S905, counters i, j, and k are initialized to zero. The counters i, j, and k iterate over indexes of scalar function (u).

Further, in step S907, a query is made to determine whether a magnitude of an entry in array (u) that is indexed by u[timestep][ii][jj][kk][i,j,k] is greater than a predetermined threshold. If the response to the query is affirmative, the process moves to step S909, else if the response to the query is negative, the process moves to step S915.

In step S909, the value of the ghost-node is copied to its corresponding position in the adjacent sub-domain. Specifically the following computation as illustrated in step S909 is performed: u[timestep][ii+1][jj][kk][i−$b_x$, j, k]=u[timestep][ii][jj][kk][i, j, k].

Further in step S911, the value in the boolean array CL at position CL[ii+1][jj][kk] is assigned a 'true' value. The process thereafter proceeds to step S915, wherein a query is made to determine whether the iterations over each index of the scalar function (u) are complete. If the response to the query is negative, the process proceeds to step S913, else the process moves to step S917.

In step S913, the value of at least one counter i, j, k is incremented in order to process the next index of the scalar function (u) and the Boolean array CL. For instance, by one embodiment, a 3-dimensional nested loop, wherein the counters i, j, and k, iterate over their respective lengths $b_x+4$, $b_y+4$, and $b_z+4$, may be utilized to ensure that all indexes of CL are processed. Upon incrementing the value of at least one counter i, j, and k, the process loops back to step S907 to repeat the process for the next index of the scalar function.

In step S917, a query is made to determine whether the counters ii, jj, and kk have parsed through each of the indexes of the sub-domain. If the response to the query is negative, the process moves to step S919 wherein the value of at least one counter ii, jj, kk is incremented in order to process the next index of the Boolean array CL. For instance by one embodiment, a 3-dimensional nested loop, wherein the counters ii, jj, and kk, iterate over their respective lengths $s_x$, $s_y$, and $s_z$, may be utilized to ensure that all indexes of CL are processed.

The process thereafter loops back to step S903 to process the next index of Boolean array CL. However, if the query in step S917 is affirmative corresponding to the case where all indexes of the sib-domain have been processed, the process in FIG. 9 terminates.

Figure 10:
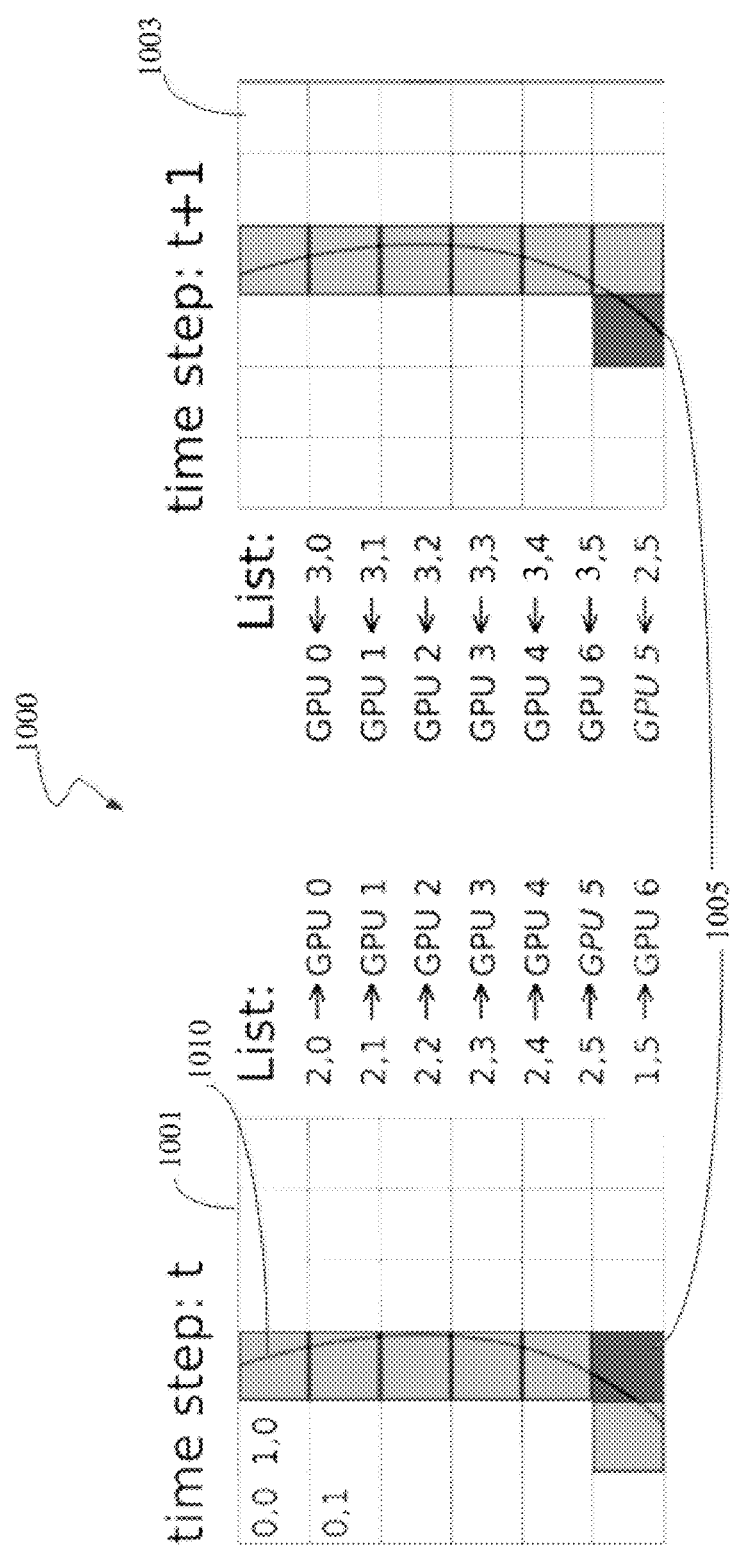
FIG. 10 depicts an exemplary illustration of two time-steps of a propagating wave.

FIG. 10 depicts an exemplary illustration 1000 of two time-steps of a propagating wave. The two time-steps are depicted for time instances 't' and 't+1', as 1001 and 1003, respectively. For sake of simplicity, the wave 1050 is represented as a wave front.

In FIG. 10, the active sub-domains are depicted in the list corresponding to each time step. At time step 't' it can be observed that seven sub-domains (represented as shaded sub-domains) are active. Accordingly, the work is distributed on seven GPUs (GPU 0 to GPU 6). Further, in the time step (t+1) the wave front moves out of some of the sub-domains into neighboring sub-domains. Hence, different sub-domains are active (represented as shaded sub-domains). Note that sub-domain (2, 5) represented as 1005 is active in both time steps. Therefore, the data corresponding to this sub-domain can be reused, and does not need to be copied. Furthermore, by one embodiment, if the number of available GPUs is smaller than seven (i.e., the number of active sub-domains in FIG. 10), the number of active sub-domains can be divided into groups corresponding to the size of the number of GPUs.

According to an embodiment of the present disclosure, in order to prove the functionality of the method of utilizing active sub-domains, four key features are reviewed. Firstly, to ensure that the accuracy of the traditional finite difference computation is preserved when applying the method, the resulting wave fields are compared to prove the accuracy of the solution. Secondly, computation times are measured to illustrate that the list building step, which is an additional step as compared to the traditional method, only contributes a small amount of the overall computing time. Thirdly, overall computing times are compared. Finally, the ability of the method to decrease effective problem size is shown by way of a real life situation. The first three key features are reviewed on the basis of two different examples that are described next. The fourth key feature is reviewed on the basis of an example, which was created to resemble a real life seismological problem. By one embodiment, the available computer architecture includes two GeForce GTX 770 MGPUs. Additionally, the examples described herein simulate a GPU cluster in order to obtain informative results.

By one embodiment, example 1 is designed to offer comprehensibility and clarity of the results presented herein. For example 1, a domain of 248×248×248 nodes is divided into 2×2×2 sub-domains of 124×124×124 nodes. The velocity is chosen to be homogeneous in the entire domain. Accounting for the ghost nodes, the resulting problem size is thus of order 256×256×256 nodes. Furthermore, for the first example, the initial condition is assumed to be a narrow Gaussian function.

Figure 11:
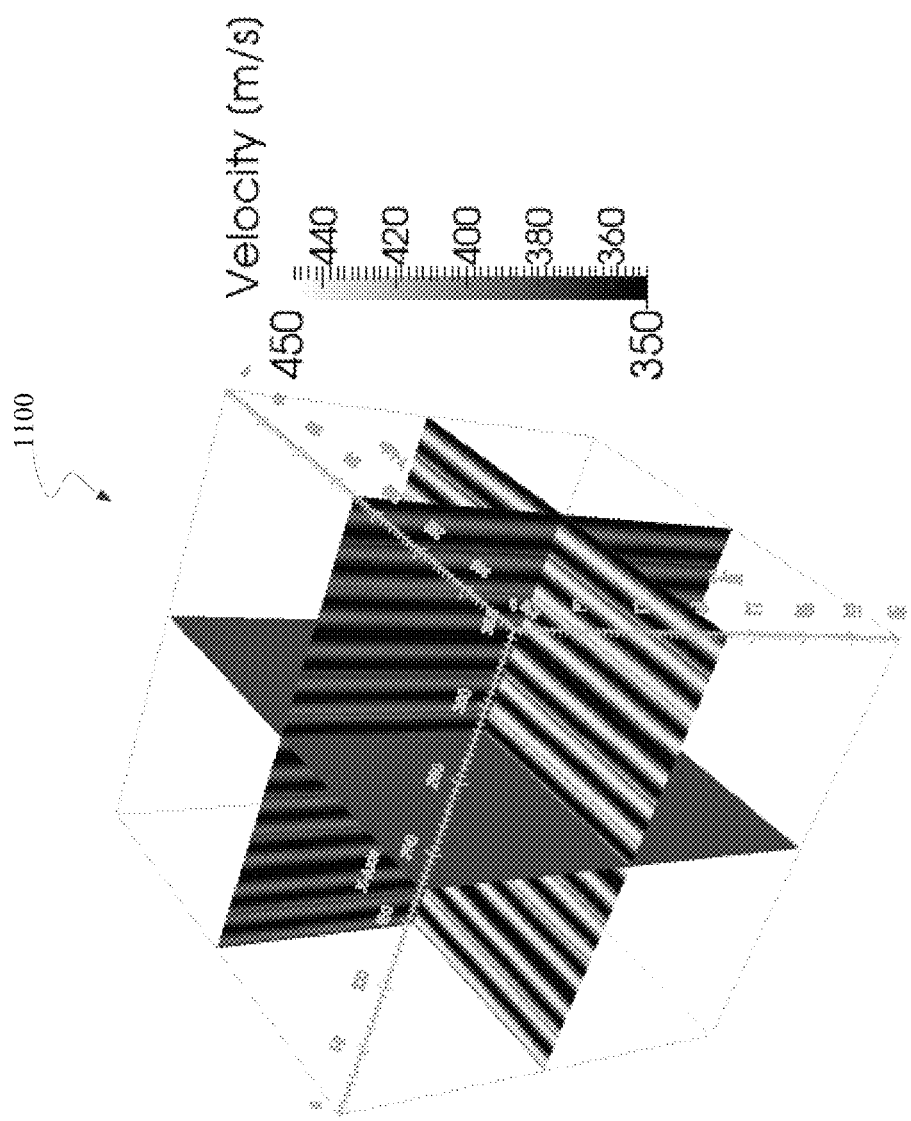
FIG. 11 depicts according to an embodiment, an exemplary velocity field.

By one embodiment of the present disclosure, example 2 is designed to investigate the performance of the method based on a real-life example. For example 2, a domain of 308×308×308 nodes is divided into 11×11×11 sub-domains of 28×28×28 nodes. The small sub-domain size provisions for the simulation based on a computer architecture that includes 1331 GPUs. FIG. 11 depicts an exemplary velocity field 1100 that is utilized to determine the accuracy of the method as described in the above embodiments. The velocity field can be expressed as:

$$v(x) = 400 + (50 \times \sin(|x| \times 38)) \quad (4)$$

The chosen velocity filed exhibits high frequencies and gradients of the velocity. Thus, the velocity field represents a proper challenge for the proposed method. Accounting for the ghost nodes, the resulting problem size is 352×352×352 nodes. Additionally, the initial condition is assumed to be a narrow Gaussian function.

Figure 12:
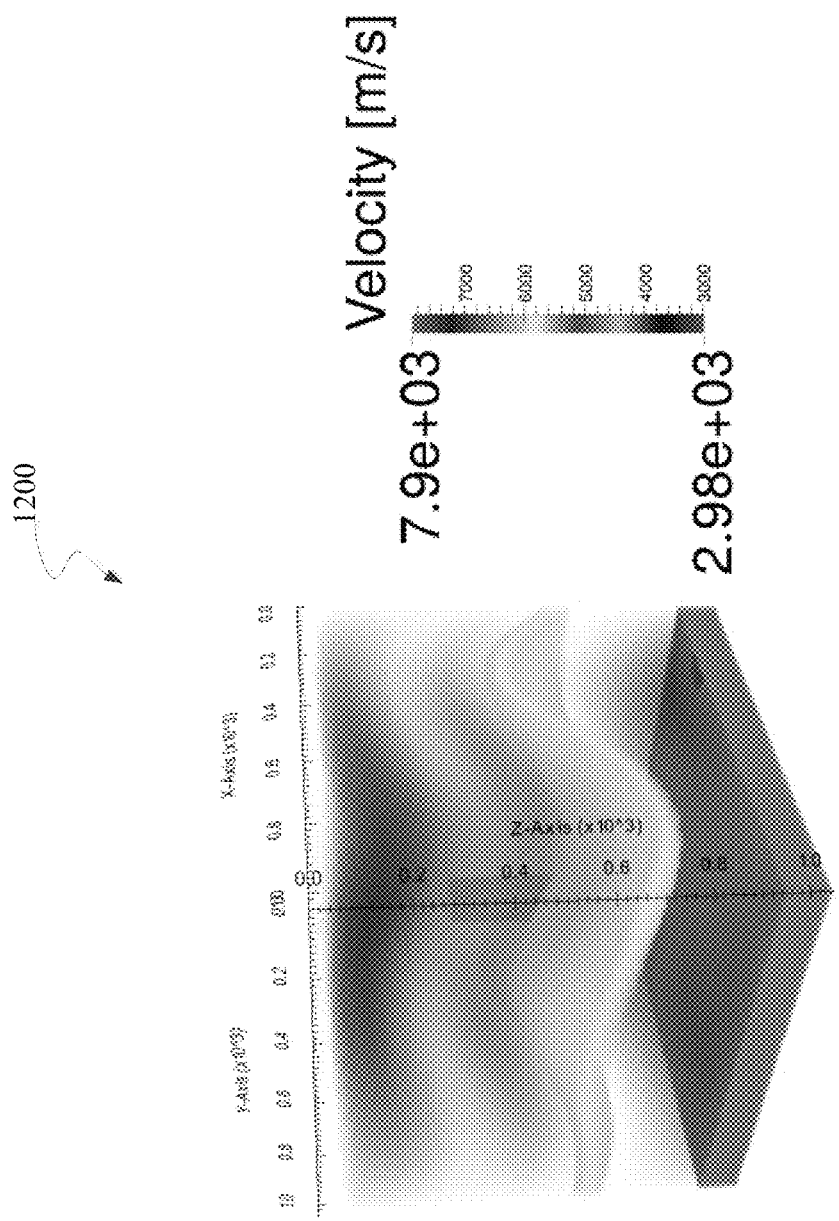
FIG. 12 depicts an exemplary velocity model corresponding to a real life geological setting.

By one embodiment, example 3 is designed to prove the validity of a central feature of the method: saving effective problem size. In the third example, a domain of 924×924×924 nodes is divided into 33×33×33 sub-domains of 28×28×28 nodes. Upon accounting for the ghost nodes, the resulting problem size is 1056×1056×1056 nodes. Furthermore, in order to make the result relevant for a real life application, the velocity field 1200 is chosen to represent a geological setting as shown in FIG. 12.

In what follows there is provided a detailed description of a comparison of the solutions of the above stated example. According to an embodiment of the present disclosure, since sub-domains are activated only if the amplitude of an approaching wave is larger than a certain threshold, it is important to make sure that the lost information does not degrade the solution. Therefore, the solution of the acoustic wave equation computed on a CPU is compared to the solution obtained with the method described herein. For an elaborated analysis of the numerical accuracy the $L_1$ and the $L_2$ norm, are defined as:

$$\|u(x,t)\|_{L_1} = \frac{\sum_{ijk} |u_{ijk}^t - \hat{u}_{ijk}^t|}{N} \quad (5)$$

and, $$\|u(x,t)\|_{L_2} = \frac{\sqrt{\sum_{ijk} (u_{ijk}^t - \hat{u}_{ijk}^t)^2}}{N} \quad (6)$$

In equations (5) and (6), $u_{ijk}^t$ represents the solution of the method described in the above embodiments (i.e., the method which divides a domain into a plurality of sub-domains), and $\hat{u}_{ijk}^t$ represents the solution computed on the CPU without division into sub-domains.

Figure 13:
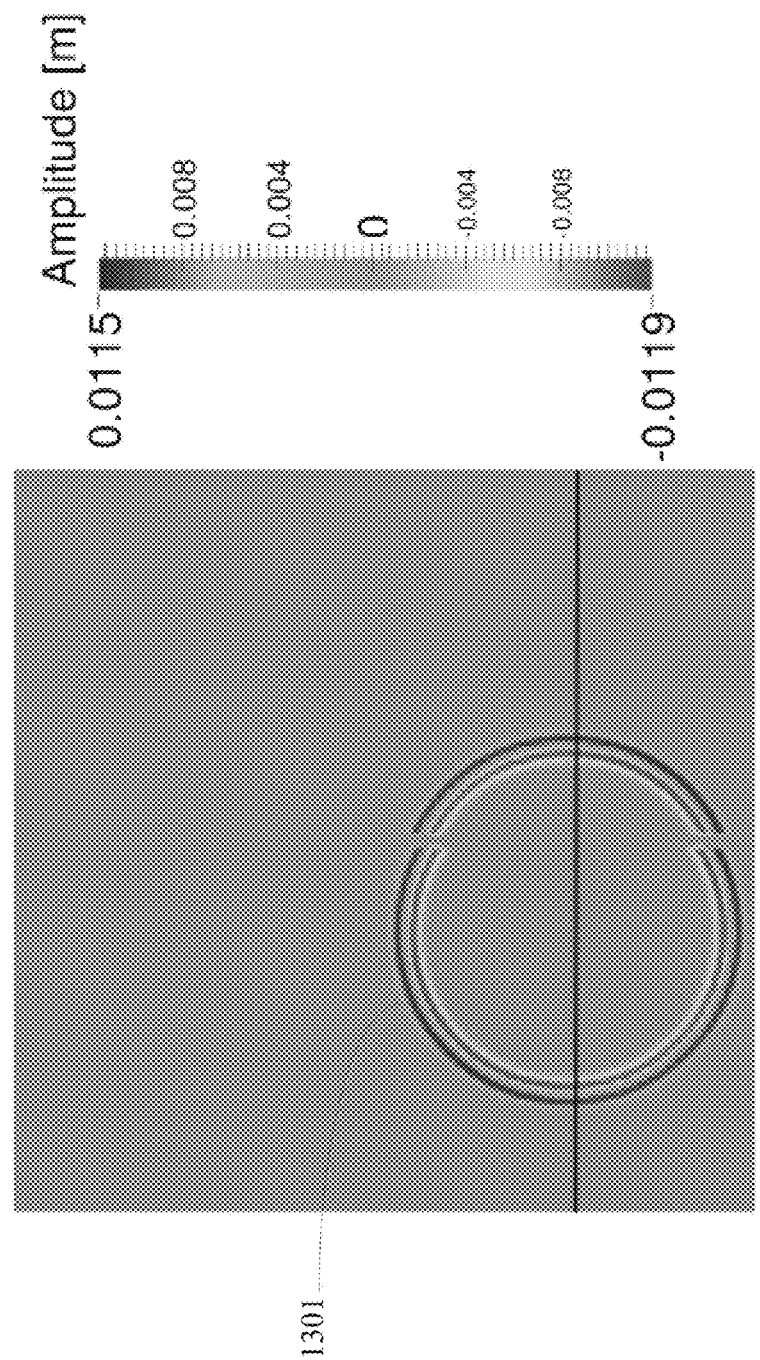
FIG. 13 illustrates an exemplary cross-section of an acoustic wave.
Figure 14:
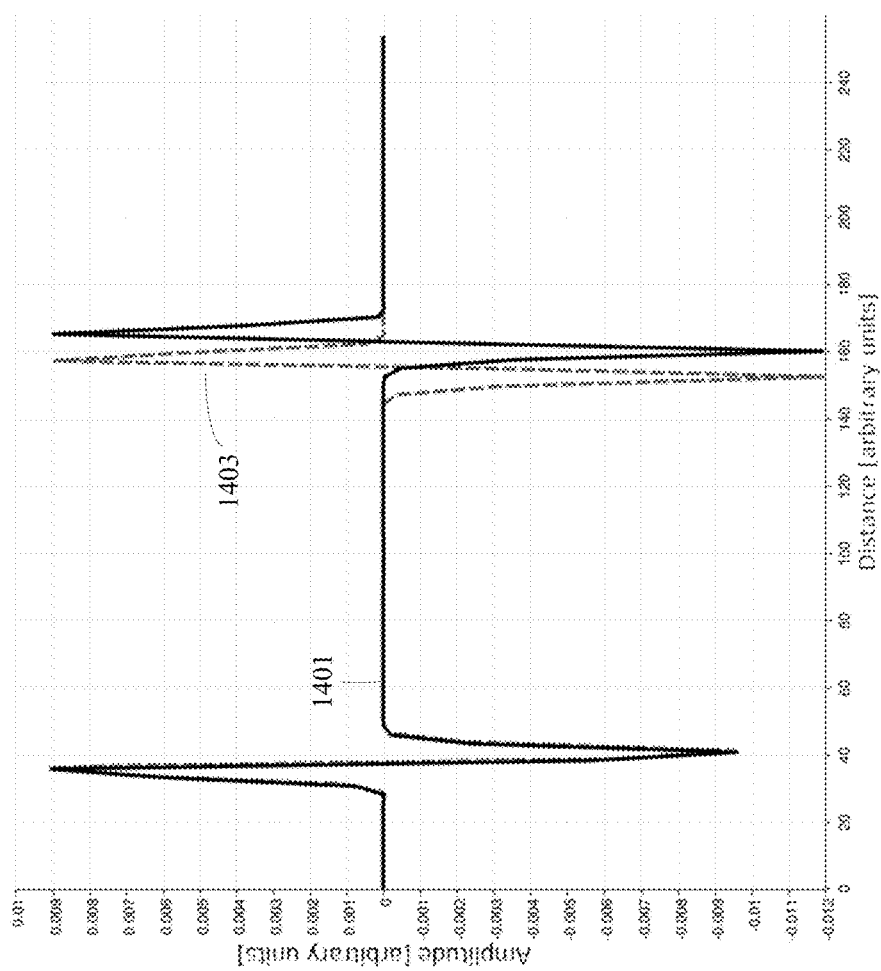
FIG. 14 depicts a graph illustrating the performance of the acoustic wave.

The solution of example 1 is first compared with the solution when the problem is executed on a CPU, along a one-dimensional cross section as shown in FIG. 13 and FIG. 14. Specifically, FIG. 13 depicts a position and orientation of a cross section 1301 of an acoustic wave depicted in FIG. 14.

FIG. 14 illustrates a comparison of the solution of the acoustic wave equation on one GPU (represented by solid curve 1401) with the solution of the method of the present disclosure (represented by dashed curve 1403). It must be noted that the two waveforms are similar in shape. However, there in a phase shift in 1403 with respect to 1401, due to the inclusion of ghost nodes. Note that the phase shift is not a numerical error and does not affect the final solution. The threshold for example depicted in FIG. 14 is 0.001% of the amplitude of the initial condition.

Figure 15:
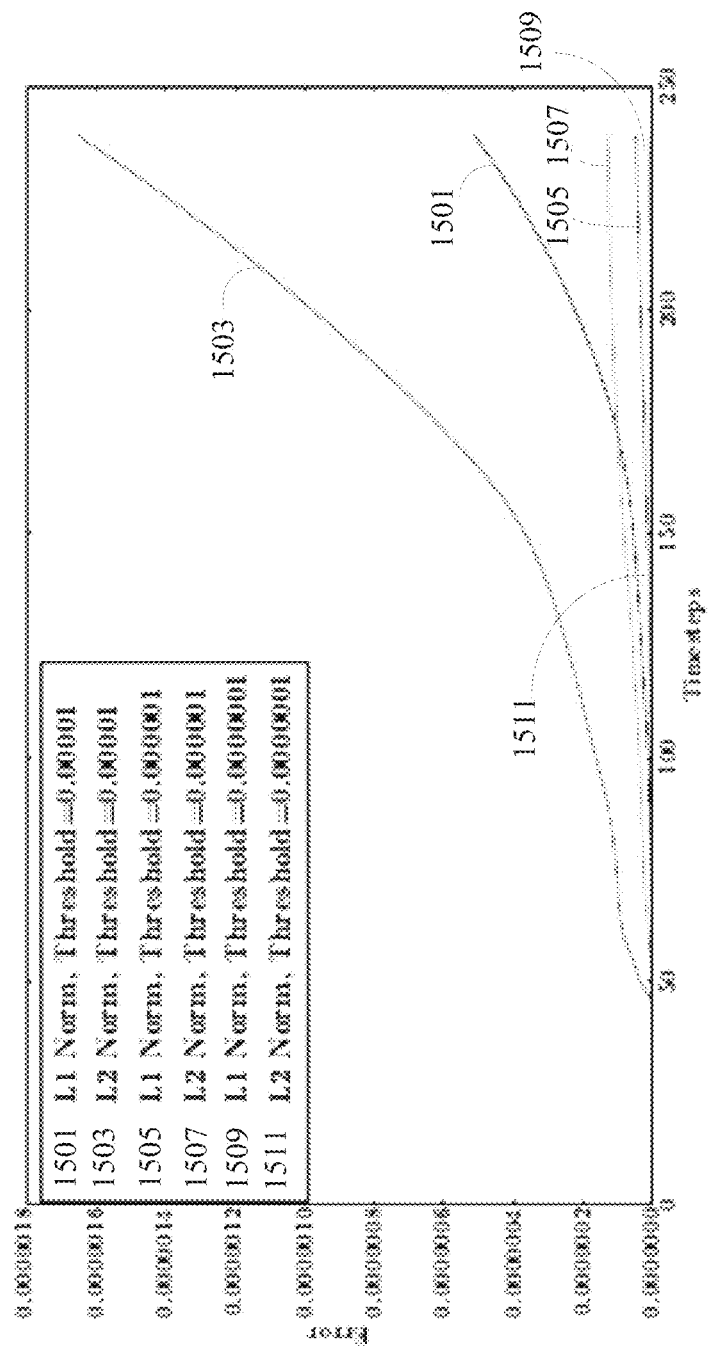
FIG. 15 depicts an exemplary graph according to an embodiment, representing error norms of a solution of a homogeneous velocity field.

The $L_1$ and $L_2$ error norms for different thresholds are illustrated in FIG. 15. FIG. 15 represents error norms L1 and L2 of the solution for a homogeneous velocity field for different time steps. It must be appreciated that the first deflection marks the first transition of the wave front into an adjacent sub-domain, and that the error reacts strongly to a reduction of the threshold level.

Figure 16:
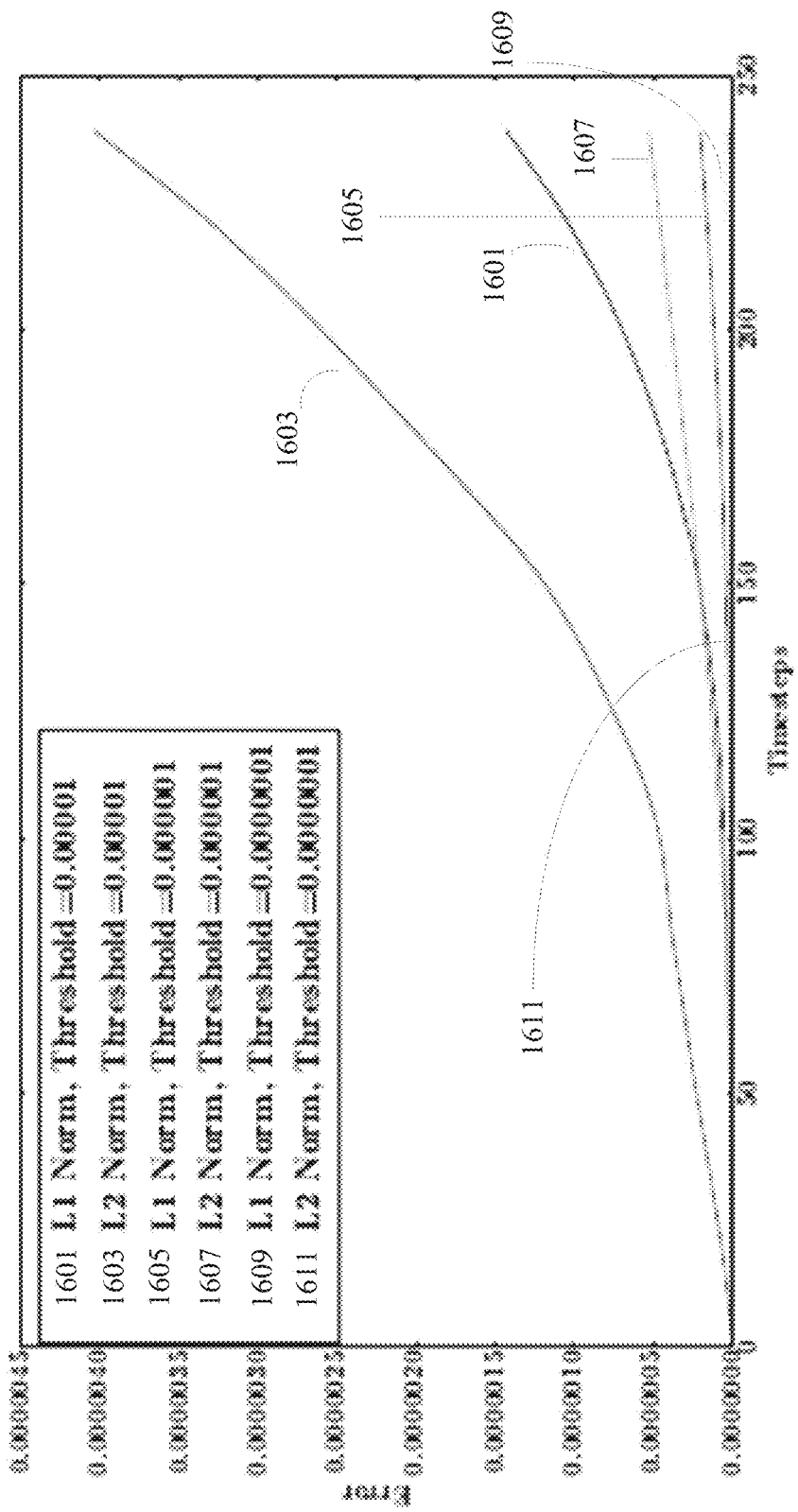
FIG. 16 depicts an exemplary graph according to another embodiment, representing error norms of a solution.

By one embodiment, example 2 was evaluated and compared to the corresponding computation on the CPU. The $L_1$ and $L_2$ error norms of the solution of example 2 are illustrated for different thresholds in FIG. 16. In order to determine the threshold, estimated amplitudes in the area of interest and numerical errors are considered. For instance, in a seismic scenario, there is no point in considering waves with an amplitude of 0.1 mm, if the computation is used to assess the risk of earthquake damage to buildings. However, for a computation of many time steps in a domain which is divided into many sub-domains, smaller thresholds are considered for accuracy reasons. FIG. 16 represents error norms L1 and L2 of the solution for the velocity field shown in FIG. 11 for different time steps. Additionally, the error reacts strongly to the reduction of the threshold. The wave source in this example (example 2) is located close to a sub-domain border, and thereby the first deflection is close to the origin.

According to an embodiment of the present disclosure, the computation of one time step includes obtaining the solution of the acoustic wave equation, a synchronization of all active sub-domains, and the building of a new schedule. To establish the techniques described by embodiments of the present disclosure as a standard way to solve the wave equation on multi-GPU computer architectures, it must be proven that the additional list building step does not consume the majority of the overall computation time.

In the synchronization step, the values of the ghost nodes are copied to adjacent sub-domains and hence to other GPUs. Note that the synchronization step is a necessary step in the traditional approach too, and therefore does not need to be justified herein. However, in the current implementation, the synchronization step is not simultaneous to the solution process on the GPU. It is therefore included in the following measurements. For instance, in example 1 the costs of synchronizing the sub-domains and building the new list amounts to 2% of the overall computational costs in the case of sequential synchronization. The synchronization in one direction can be a parallelized loop, and thereby the synchronization and list building steps consume only about 0.5% of the overall computation time on a 4-core CPU machine (e.g., Intel Core i7-4800MQ CPU @ 2.70 GHz).

The percentage of computational costs of the list building step and the synchronization step mainly depend on the ratio between the ghost nodes and the overall number of nodes. According to one embodiment, the implementation includes a condition to ensure that only active sub-domains are synchronized, which lowers the computational costs and represents an advantage compared to the traditional approach where all sub-domains (and hence all GPUs) have to communicate during the entire computing time, independent of whether or not there is information to exchange.

For instance, as a worst case scenario for the methods of the present disclosure, the computing time of the list building and synchronization steps are measured for example 2. The small sub-domains result in a low ratio of overall nodes to ghost nodes, which maximizes the synchronization time. For example 2, the list building and synchronization steps require approximately 3.56% of the overall computing time using sequential synchronization. Additionally, for the case of a parallelized synchronization on a 4-core CPU machine, the list building and synchronization steps require below 1% of the overall computing time.

Figure 17:
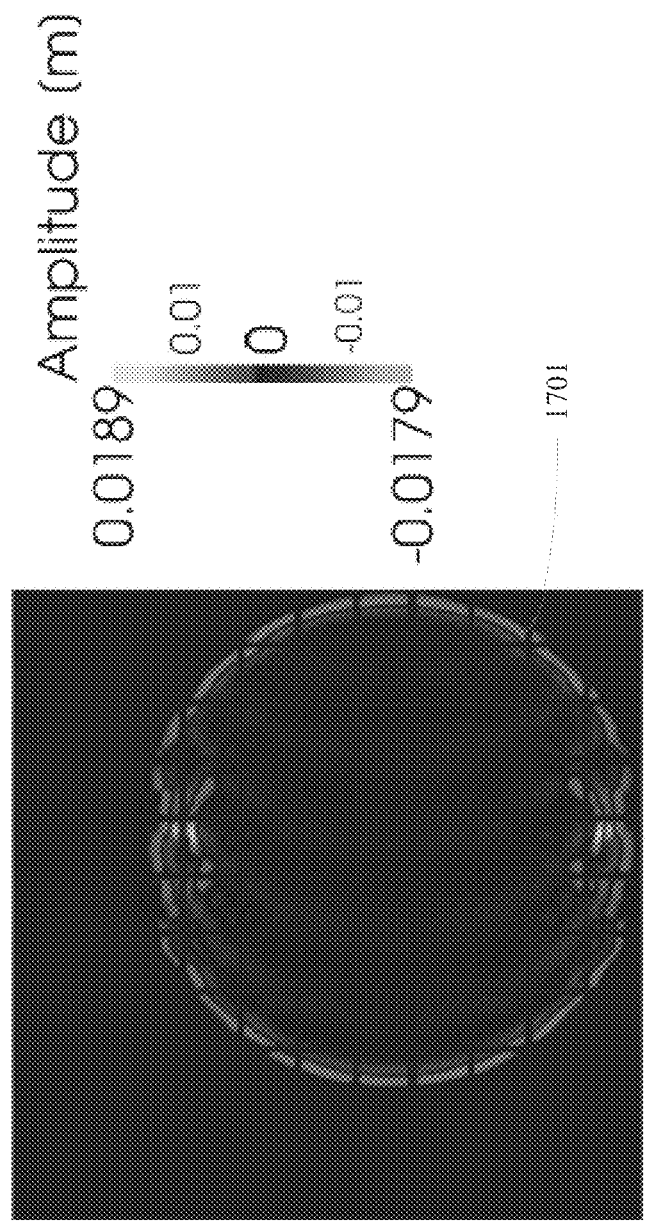
FIG. 17 depicts an exemplary slice of wave-field.

By one embodiment, the method of obtaining a fully parallelized solution of wave equations reaches its full potential on a multi-GPU cluster when the number of GPUs is equal to the maximum number of active sub-domains during computation. It must be noted that the problem size of example 1 and 2 described previously are chosen to simulate a GPU cluster, which is able to communicate between GPUs instantly. In what follows, there is provided a comparison of the overall computation times of example 1 and example 2, respectively. The wave-field 1701 utilized in the above comparison is depicted in FIG. 17. The computing time of example 1 is presented and compared to the same computation on one GPU, which can simulate eight GPUs because of the small problem size. One GPU computes 100 time steps in 14.7 seconds using the traditional method, whereas the method of the present disclosure requires only 4.84 seconds, which makes the computation 3.02 times faster. It must be appreciated that the speed up in this example is due to the fact that the effective problem size is reduced to 124×124×124 nodes for the first 80 time steps before the wave front propagates into adjacent sub-domains.

Example 1 depicts the functionality when having a small number of sub-domains. For a more elaborated investigation of the computing times, example 2 is provided and compared to the traditional method. Furthermore, the operating conditions for the traditional method are optimized. As described, since the traditional computation takes place on one GPU, there is no communication step. Nonetheless, even for the optimized conditions of the traditional method, the speed up of the methods of the present embodiments is significantly better. For instance, it is observed that one GPU computes 150 time-steps in 36.62 seconds on the grid, whereas the techniques of the present disclosure use only a maximum of 120 active sub-domains and incur a total computation time of 7.88 seconds (i.e., the computation times of the method of the present disclosure is of the order of 4.64 times faster than the traditional approach). Additionally, for 300 time-steps, the method of the present disclosure takes 58 seconds, while the traditional approach requires 73 seconds. Thus, the speedup in this case is of a factor of 1.26.

According to an embodiment of the present disclosure, the previously described example 3 illustrates the efficiency of the techniques of the present disclosure with respect to the amount of computing resources saved for a real life situation. For instance, 2000 time steps are computed that enable the wave front to travel through all sub-domains. The number of active sub-domains in each time step for two different thresholds is depicted in FIG. 18.

Figure 18:
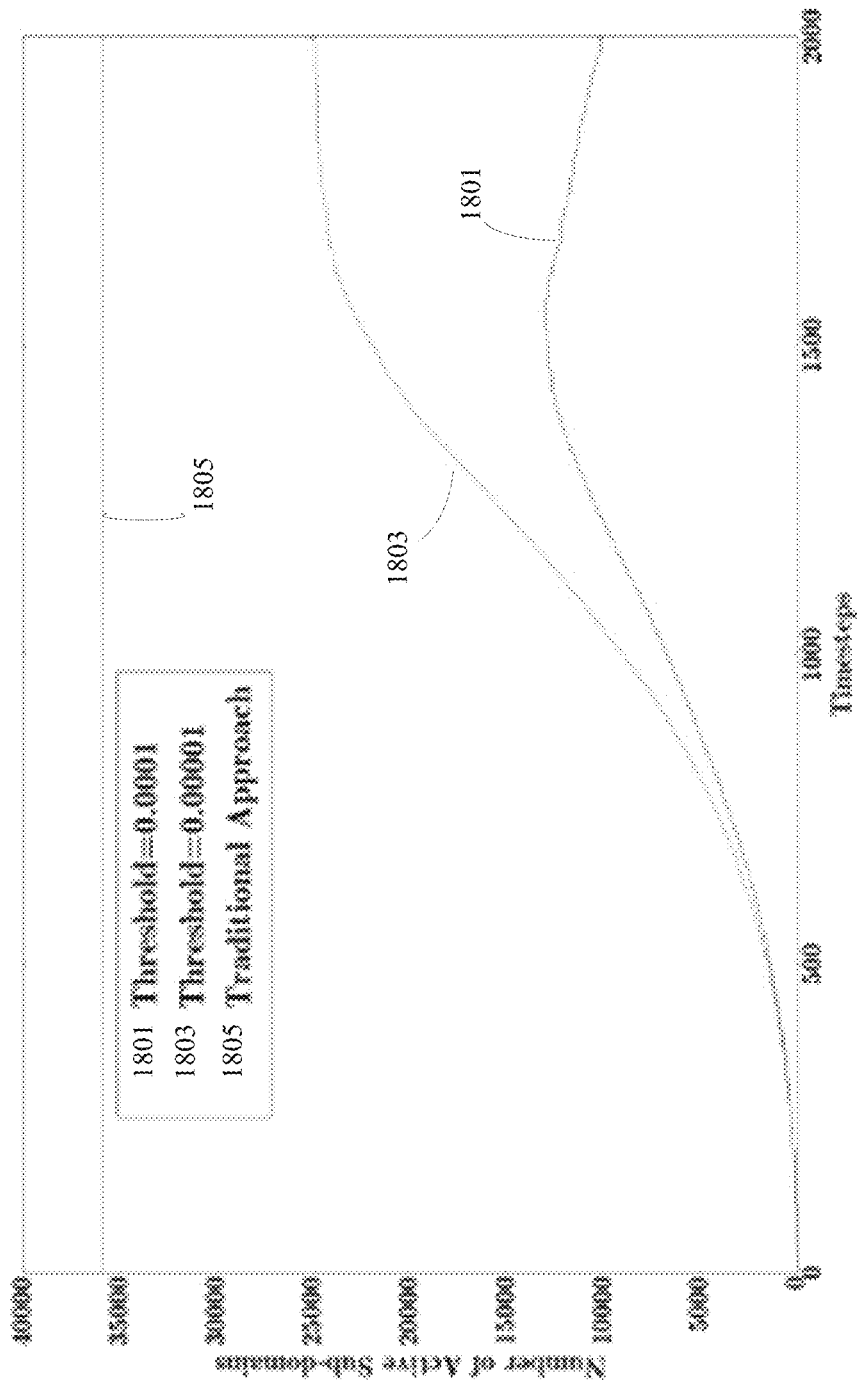
FIG. 18 depicts a graph illustrating a comparison of a number of active sub-domains.

Specifically, FIG. 18 depicts a graph illustrating a comparison of a number of active sub-domains. In FIG. 18, the number of active sub-domains required for the two thresholds of 0.0001 and 0.00001, are depicted by curves 1801 and 1803 respectively, while by the number of active sub-domains in the traditional method are depicted by curve 1805. The maximum number of active sub-domains is 13700 or 25086, and on average 6563 or 11232 sub-domains were active for the thresholds of 0.0001 and 0.00001 respectively. To obtain a meaningful measure to compare the efficiency of the traditional approach as compared to the techniques described herein, a number of overall computed nodes is considered. Using the traditional approach 229.76e10 nodes are computed, whereas the methods of the present disclosure compute a total of 58.88e10 nodes for the threshold of 0.0001 and 106.24e10 nodes for a threshold of 0.00001. Thus, the results indicate that using the methods of the present disclosure, in example 3, 74.4% (for a threshold of 0.0001) or 53.7% (for a threshold of 0.00001) of computing resources can be saved.

To reiterate, the method, as described by the above embodiments of the present disclosure, compute the same result as the computation on one single GPU with a significant improvement in computational efficiency. FIG. 14 shows that there is only a negligible difference in amplitude. The phase shift is included intentionally to show the effect of the ghost layers, and can easily be removed. The $L_1$ and $L_2$ error norms show how the error introduced by ignoring small values develops over time. Furthermore, it is shown that the error strongly reacts to the reduction of the threshold size. Therefore, for large problems, smaller thresholds can be chosen. In these scenarios, the method of the present disclosure maintains its superiority over the traditional methods since more sub-domains correspond to a more accurate separation of inactive zones from the active zones.

Larger problem sizes also allow for a greater ratio of inactive to active zones since commonly emerging wavelengths are smaller as compared to the problem size. In other words, the larger the model size as compared to the emerging wavelengths, the higher the possibility for in-activating most of the model space, especially when using a very time limited source term. This feature provides the present disclosure the advantageous ability of allowing smaller thresholds when computing larger problems without loss of benefit. The comparison of the error norms of example 1 and example 2 also depicts that the error increases only slightly for complex problems.

By one embodiment, a beneficial effect of the method is as follows: regions where the amplitude of the wave is smaller than a certain threshold are not part of the computation, and do not waste computing resources. This principle leads to a significant speed up even for an example that is not perfectly suited for the method. Instead of one GPU dealing with 256×256×256 nodes, the algorithm activates only one sub-domain in the beginning thereby leading to a much smaller effective problem size. In later time steps, the adjacent sub-domains are activated. Since only two GPUs can be employed, more than two active sub-domains means an imposed partly sequential computation. However, the speedup of 3.02 times is still beneficial. In example 1, eight GPUs will not be faster since the activation of most sub-domains happens in the last 20 time steps. Hence, most of the time, the GPUs are idle. Furthermore, the methods of the present disclosure provision for the division into eight sub-domains with two available GPUs possible in the first place.

With regard to example 2, the example simulates a real life example computed on a GPU cluster equipped with 1331 GPUs. Each GPU can compute the solution of the wave equation on a grid of 28×28×28 nodes. Since the problem size is manageable by one GPU, the simulated cluster does not need to communicate when performing the traditional approach, therefore giving it an unrealistic advantage. During the computation, using the traditional method, most of the simulated 1331 GPUs are waiting most of the time for their turn. On the other hand, as described previously, the method of the present disclosure checks for active sub-domains and reduces the efficient problem size significantly to a maximum of 120 sub-domains in the first 150 time steps. The result is thus a 4.64 orders of magnitude faster computation.

Furthermore, it must be appreciated that the preceding discussion assumes for comparison purposes, a best case scenario for the traditional method and the worst case scenario for the methods of the present disclosure. Even in this worst case scenario, the computing time for the list building and synchronization steps is small because only active sub-domains are synchronized with their neighbors and the synchronization can be performed in parallel. The same example conducted for 300 time-steps resulted in a computation speedup by a factor of 1.26. The smaller speed up for 300 time-steps is due to the special character of the velocity field. The high-frequency, periodic velocity field causes many reflections which make it impossible to inactivate sub-domains when using the given setting (as shown in FIG. 17).

In this case, a larger grid and more time steps would be beneficial since the amplitude of the reflected waves would decay below the threshold at some point. Example 3 proved the ability to save computing resources on the basis of a real life application. Instead of 35947 active sub-domains used by the traditional method, the methods of the present disclosure only activate a maximum number of 13700 or 25086 sub-domains depending on the size of the threshold. On average 6563 or 11232 sub-domains were active. The overall number of computed nodes depicted that the saving of computer resources is significant for the chosen examples for both thresholds.

It must be appreciated that the success of the method is dependent on problem specific parameters, like source definition, velocity model, problem size, and on the used computer architecture. However, all wave propagation algorithms can benefit from the proposed algorithm in the beginning of the wave propagation. When the active wave field is small, all GPUs can be used for a higher resolution and hence higher accuracy of finite different approximations around the source can be obtained.

Each of the functions of the described embodiments may be implemented by one or more processing circuits. The method of the above described embodiments may be performed by an apparatus including circuitry as described next with reference to FIG. 19. A processing circuit includes a programmed processor (for example, processor 1903 in FIG. 19), as a processor includes circuitry. A processing circuit also includes devices such as an application-specific integrated circuit (ASIC) and circuit components that are arranged to perform the recited functions. The circuitry may be particularly designed or programmed to implement the above described functions and features which improve the processing of the circuitry and/or computer and allow data to be processed in ways not possible by a human or even a general purpose computer lacking the features of the present embodiments.

Figure 19:
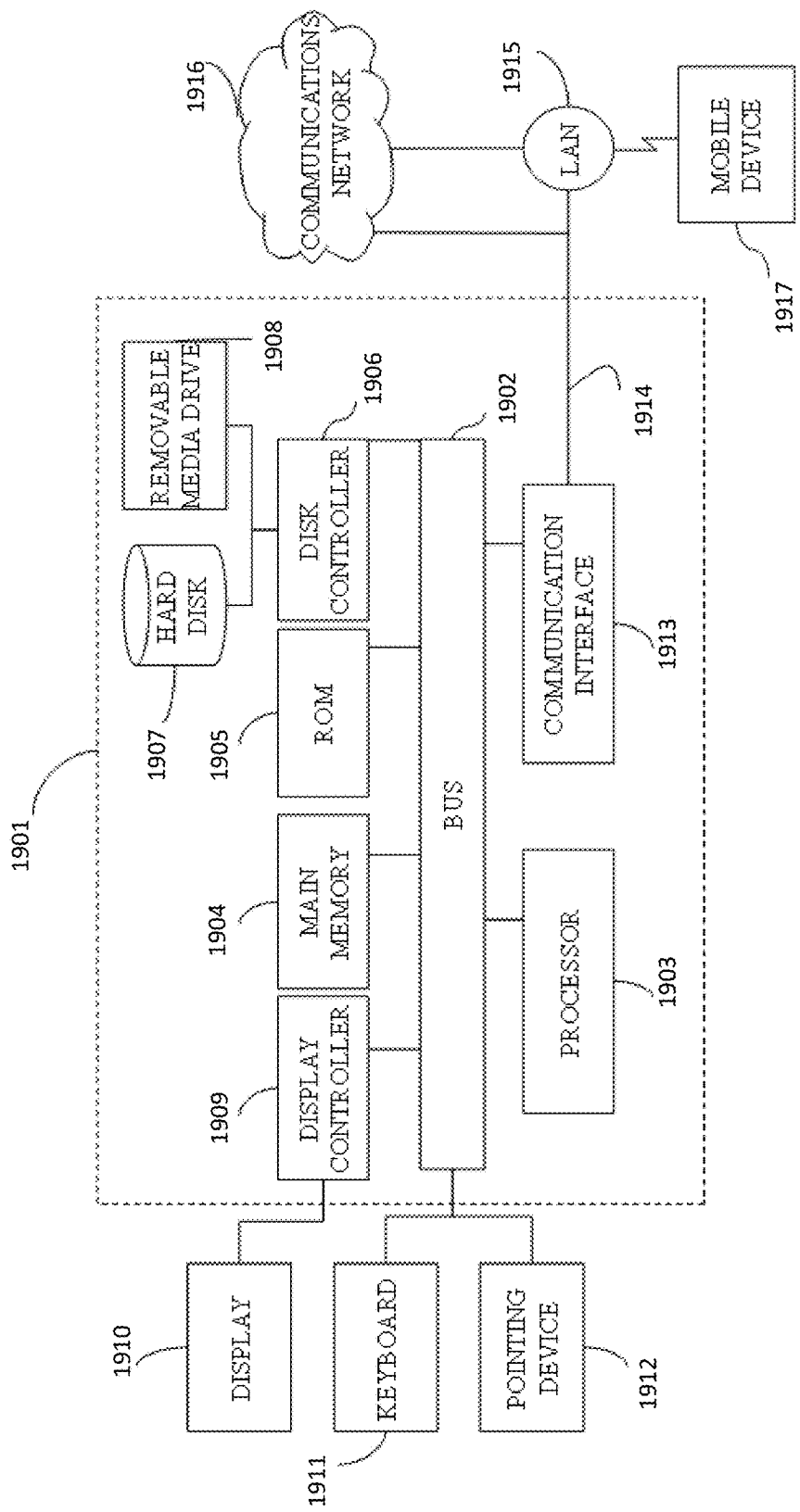
FIG. 19 illustrates a block diagram of a computing device according to one embodiment.

The various features discussed above may be implemented by a computer system (or programmable logic). FIG. 19 illustrates such a computer system 1901. In one embodiment, the computer system 1901 is a particular, special-purpose machine when the processor 1903 is programmed to perform the estimate computations and other functions described above.

The computer system 1901 includes a disk controller 1906 coupled to the bus 1902 to control one or more storage devices for storing information and instructions, such as a magnetic hard disk 1907, and a removable media drive 1908 (e.g., floppy disk drive, read-only compact disc drive, read/write compact disc drive, compact disc jukebox, tape drive, and removable magneto-optical drive). The storage devices may be added to the computer system 1901 using an appropriate device interface (e.g., small computer system interface (SCSI), integrated device electronics (IDE), enhanced-IDE (E-IDE), direct memory access (DMA), or ultra-DMA).

The computer system 1901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1901 may also include a display controller 1909 coupled to the bus 1902 to control a display 1910, for displaying information to a computer user. The computer system includes input devices, such as a keyboard 1911 and a pointing device 1912, for interacting with a computer user and providing information to the processor 1903. The pointing device 1912, for example, may be a mouse, a trackball, a finger for a touch screen sensor, or a pointing stick for communicating direction information and command selections to the processor 1903 and for controlling cursor movement on the display 1910.

The processor 1903 executes one or more sequences of one or more instructions contained in a memory, such as the main memory 1904. Such instructions may be read into the main memory 1904 from another computer readable medium, such as a hard disk 1907 or a removable media drive 1908. One or more processors in a multi-processing arrangement may also be employed to execute the sequences of instructions contained in main memory 1904. In alternative embodiments, hard-wired circuitry may be used in place of or in combination with software instructions. Thus, embodiments are not limited to any specific combination of hardware circuitry and software.

As stated above, the computer system 1901 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1901, for driving a device or devices for implementing the features of the present disclosure, and for enabling the computer system 1901 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1903 for execution. A computer readable medium may take many forms, including but not limited to, non-volatile media or volatile media. Non-volatile media includes, for example, optical, magnetic disks, and magneto-optical disks, such as the hard disk 1907 or the removable media drive 1908. Volatile media includes dynamic memory, such as the main memory 1904. Transmission media, on the contrary, includes coaxial cables, copper wire and fiber optics, including the wires that make up the bus 1902. Transmission media also may also take the form of acoustic or light waves, such as those generated during radio wave and infrared data communications.

Various forms of computer readable media may be involved in carrying out one or more sequences of one or more instructions to processor 1903 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1901 may receive the data on the telephone line and place the data on the bus 1902. The bus 1902 carries the data to the main memory 1904, from which the processor 1903 retrieves and executes the instructions. The instructions received by the main memory 1904 may optionally be stored on storage device 1907 or 1908 either before or after execution by processor 1903.

The computer system 1901 also includes a communication interface 1913 coupled to the bus 1902. The communication interface 1913 provides a two-way data communication coupling to a network link 1914 that is connected to, for example, a local area network (LAN) 1915, or to another communications network 1916 such as the Internet. For example, the communication interface 1913 may be a network interface card to attach to any packet switched LAN. As another example, the communication interface 1913 may be an integrated services digital network (ISDN) card. Wireless links may also be implemented. In any such implementation, the communication interface 1913 sends and receives electrical, electromagnetic or optical signals that carry digital data streams representing various types of information.

The network link 1914 typically provides data communication through one or more networks to other data devices. For example, the network link 1914 may provide a connection to another computer through a local network 1915 (e.g., a LAN) or through equipment operated by a service provider, which provides communication services through a communications network 1916. The local network 1914 and the communications network 1916 use, for example, electrical, electromagnetic, or optical signals that carry digital data streams, and the associated physical layer (e.g., CAT 5 cable, coaxial cable, optical fiber, etc.). The signals through the various networks and the signals on the network link 1914 and through the communication interface 1913, which carry the digital data to and from the computer system 1901 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1901 can transmit and receive data, including program code, through the network(s) 1915 and 1916, the network link 1914 and the communication interface 1913. Moreover, the network link 1914 may provide a connection through a LAN 1915 to a mobile device 1917 such as a personal digital assistant (PDA) laptop computer, or cellular telephone.

Furthermore, it must be appreciated that the embodiments described herein are equally applicable to the scenario of having irregularly shaped sub-domains. Additionally, the methods of the present disclosure could be implemented by an automatic tool that defines sub-domains depending on wave activity and the number of available GPU devices. Such a tool could divide the active regions into as many sub-domains as possible, resulting in higher resolution and/or computational performance. The goal however is to optimally distribute computing resources only to active regions and not waste resources by allocating them to regions in the domain where the wave exhibits negligible amplitudes.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

Furthermore, the foregoing discussion discloses and describes merely exemplary embodiments of the present invention. As will be understood by those skilled in the art, the present disclosure may be embodied in other specific forms without departing from the spirit or essential characteristics thereof. Accordingly, the present disclosure is intended to be illustrative and not limiting of the scope, as well as the claims. The disclosure, including any readily discernible variants of the teachings herein, defines in part, the scope of the foregoing claim terminology such that no subject matter is dedicated to the public. Additionally, the above disclosure also encompasses the embodiments listed below:

(1) A method for allocating hardware-based processing units for a wave modeling computation, comprising: generating a computational domain representing a physical region in which wave amplitudes for physical waves are determined; dividing the domain into a plurality of sub-domains; determining which sub-domains of the plurality of sub-domains are active; for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, when the active sub-domain is determined to become inactive in the next computational step, allocating the at least one available hardware-based processing unit to other computational tasks.

(2) The method according (1), wherein the other computational task comprises a second portion of the wave modeling computation corresponding to another active sub-domain different from the active sub-domain.

(3) The method according to (2), further comprising: executing the second portion of the wave modeling computation at a higher computational resolution than the resolution at which the first portion of the wave modeling computation was executed.

(4) The method according to (1), further comprising: assigning all hardware-based processing units available for the wave modeling computation to only active sub-domains.

(5) The method according to (1), further comprising: scheduling use of the hardware-based processing units according to available slots in a schedule, wherein the first portion of the wave modeling computation is executed according to the schedule.

(6) The method according to (1), wherein the determining of which sub-domains of the plurality of sub-domains are active is based on results from a previously executed portion of the wave modeling computation.

(7) The method according to (1), wherein the determining of which sub-domains of the plurality of sub-domains are active is based on determining in which sub-domains wave generation sources are located.

(8) The method according to (1), wherein the determining of whether the active sub-domain will remain active in a next computational step is based on detecting whether waves in the active sub-domain propagate outside of the active sub-domain.

(9) The method according to (1), wherein the determining of whether the active sub-domain will remain active in a next computational step is based on detecting whether any wave amplitude in the active sub-domain is above a given threshold.

(10) The method according to (1), further comprising: determining whether a neighboring sub-domain will become active in the next computational step, when the neighboring sub-domain is determined to become active in the next computational step, allocating the at least one available hardware-based processing unit to the neighboring sub-domain.

(11) The method according to (10), wherein the determining of whether a neighboring sub-domain will become active in the next computational step is applied only on inactive neighboring sub-domains.

(12) The method according to (1), further comprising: generating a list including all active sub-domains based on the determining of which sub-domains of the plurality of sub-domains are active.

(13) The method according to (12), wherein the list includes coordinates of each active sub-domain.

(14) The method according to (12), wherein the list is maintained by at least one processor that coordinates the assignment of hardware-based processing units based on the list.

(15) The method according to (1), wherein each sub-domain includes a plurality of nodes, each node comprising a wave amplitude.

(16) The method according to (15), wherein each sub-domain includes a group of ghost nodes having wave amplitudes obtained from boundary nodes in an adjacent sub-domain when a wave amplitude of the boundary nodes is larger than a predetermined threshold.

(17) The method according to (16), wherein the boundary nodes comprise a two node wide boundary of the nearest nodes in the adjacent sub-domain.

(18) The method according to (16), wherein the ghost nodes have the same coordinates in the computational domain as the boundary nodes of the adjacent sub-domain from which the wave amplitudes are obtained.

(19) The method according to (16), wherein the wave amplitudes are obtained in parallel one direction at a time.

(20) The method according to (16), further comprising: obtaining wave amplitudes to a first subset of the ghost nodes from boundary nodes in a first orthogonally adjacent sub-domain; obtaining wave amplitudes to a second subset of the ghost nodes from boundary nodes in a second orthogonally adjacent sub-domain, wherein the first and second subsets are different, and wherein the first and second orthogonally adjacent sub-domains are opposite to each other.

(21) The method according to (20), wherein the obtaining of wave amplitudes to the second subset immediately follows the obtaining of wave amplitudes to the first subset.

(22) The method according to (20), further comprising: obtaining wave amplitudes to a third subset of the ghost nodes from boundary nodes in a third orthogonally adjacent sub-domain; obtaining wave amplitudes to a fourth subset of the ghost nodes from boundary nodes in a fourth orthogonally adjacent sub-domain, wherein the first, second, third and fourth subsets are different, and wherein the third and fourth orthogonally adjacent sub-domains are opposite to each other and diagonally adjacent to the first and second orthogonally adjacent sub-domains.

(23) The method according to (22), wherein sub-domains are orthogonally adjacent if they share one edge and diagonally adjacent if they share one corner.

(24) The method according to (22), further comprising: obtaining wave amplitudes to a fifth subset of the ghost nodes from boundary nodes in a fifth orthogonally adjacent sub-domain; obtaining wave amplitudes to a sixth subset of the ghost nodes from boundary nodes in a sixth orthogonally adjacent sub-domain, wherein the first, second, third, fourth, fifth and sixth subsets are different, and wherein the fifth and sixth orthogonally adjacent sub-domains are opposite to each other and diagonally adjacent to the first, second, third and fourth orthogonally adjacent sub-domains.

(25) The method according to (24), wherein sub-domains are orthogonally adjacent if they share one surface and diagonally adjacent if they share one edge.

(26) The method according to (1), wherein a quantity of the plurality of sub-domains is determined by the dividing based on a quantity and capability of the hardware-based processing units.

(27) The method according to (1), wherein a quantity of the plurality of sub-domains is determined by the dividing based on a desired computational resolution.

(28) The method according to (1), wherein a quantity of the plurality of sub-domains is greater than a quantity of hardware-based processing units.

(29) The method according to (1), further comprising: for an initial computational step prior to the plurality of computational steps, initializing an amplitude for each node of each sub-domain.

(30) The method according to (1), wherein the hardware-based processing units are included in at least one graphics processing unit (GPU), field-programmable gate array (FPGA), or programmable system-on-chip (PSoC).

(31) The method according to (1), wherein the hardware-based processing units are included in computer equipment located in a computing facility.

(32) The method according to (1), wherein the computational step is a time step.

(33) The method according to (1), wherein the wave amplitudes represent mechanical wave amplitudes.

(34) The method according to (33), wherein the mechanical wave amplitudes are one or more of: longitudinal wave amplitudes, shear wave amplitudes, vibration wave amplitudes.

(35) The method according to (33), wherein the mechanical wave amplitudes are surface wave amplitudes.

(36) The method according to (1), wherein the wave amplitudes represent electromagnetic wave amplitudes.

(37) The method according to (1), wherein the physical region is any of: a solid volume, a liquid volume, a gaseous volume, a plasma volume, a vacuum volume.

(38) The method according to (1), wherein the wave modeling computation is a wave propagation simulation.

(39) The method according to (38), further comprising: computing a maximum or minimum amplitude based on the wave propagation simulation.

(40) The method according to (1), wherein the wave modeling computation computes a risk of the wave amplitudes reaching a maximum allowable amplitude.

(41) The method according to (1), wherein the wave modeling computation computes a position of a wave generation source.

(42) The method according to (1), wherein the wave modeling computation computes an optimal placement of any of: wave generation sources, wave propagation media, wave absorption sinks, wave reflection surfaces, wave refraction surfaces.

(43) The method according to (1), wherein the wave modeling computation computes an optimal number of any of: wave generation sources, wave propagation media, wave absorption sinks, wave reflection surfaces, wave refraction surfaces.

(44) The method according to (1), wherein the wave modeling computation computes optimal physical wave interaction properties of any of: wave generation sources, wave propagation media, wave absorption sinks, wave reflection surfaces, wave refraction surfaces.

(45) The method according to (38), wherein the wave propagation simulation models any of: water, wind, sound, fire, explosion, sun plasma, stress fields.

(46) The method according to (40), wherein the wave modeling computation computes values for any of: seismic risk assessment, vibration risk assessment, wind risk assessment, tsunami risk assessment, rouge wave risk assessment, hearing-damage risk assessment, sun wind risk assessment.

(47) The method according to (1), wherein the wave modeling computation computes values for any of: earthquake epicenter positioning, vibration source positioning, vibration dampening optimization, radio source positioning, construction robustness enhancement, noise cancellation, sound speaker tuning, musical instrument design optimization, light source placement optimization, window design optimization, mirror design optimization, solar panel design optimization, optical device image correction, brain imaging optimization, pacemaker optimization, heart resynchronization therapy optimization, mobile base station placement optimization, satellite positioning signal correction.

(48) The method according to (1), wherein the physical region at least in part represents one or more of: a building, a bridge, a tower, a turbine, a windmill, an engine, a ship, a mast, an oil platform, an airplane, a car, a train, a tram, a carriage, an armored vehicle, a room, furniture, a wall, a sound speaker, a sound dampener, a musical instrument, a human body, an organ, a skeleton, a body armor, a projectile, a bomb, a planet, a satellite, a star, a rock formation, a shale formation, a salt formation, a sea bottom floor.

(49) The method according to (1), implemented in one or more of: a radio, a radar system, a camera, an x-ray scanner, a magnetic resonance imaging device, an ultrasound device, a sonar system, a seismological survey vessel, a computer gaming station, a virtual reality headset, a fiber optic switch, a high performance computing facility.

(50) An apparatus for allocating hardware-based processing units for a wave modeling computation, comprising: circuitry configured to generate a computational domain representing a physical region in which wave amplitudes for physical waves are determined; divide the domain into a plurality of sub-domains; determine which sub-domains of the plurality of sub-domains are active; for a computational step of a plurality of computational steps and in each active sub-domain of the plurality of active sub-domains, execute a first portion of the wave modeling computation corresponding to the active sub-domain by at least one available hardware-based processing unit and determine whether the active sub-domain will remain active in a next computational step of the plurality of computational steps, when the active sub-domain is determined to become inactive in the next computational step, allocate the at least one available hardware-based processing unit to other computational tasks.

(51) The apparatus of claim 50, further comprising circuitry configured to execute a method selected from the set (2) to (49).

(52) A non-transitory computer readable medium storing thereon instructions that when executed by a computer cause the computer to execute a method for allocating hardware-based processing units for a wave modeling computation, the method comprising: generating a computational domain representing a physical region in which wave amplitudes for physical waves are determined; dividing the domain into a plurality of sub-domains; determining which sub-domains of the plurality of sub-domains are active; for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, when the active sub-domain is determined to become inactive in the next computational step, allocating the at least one available hardware-based processing unit to other computational tasks.

(53) The non-transitory computer readable medium (52), wherein the method further comprises a method selected from the set (2) to (49).

The invention claimed is:

1. A method for allocating hardware-based processing units for a wave modeling computation, comprising:
   generating a computational domain representing a physical region in which wave amplitudes for physical waves are determined;
   dividing the domain into a plurality of sub-domains;
   determining which sub-domains of the plurality of sub-domains are active;
   for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, and
   when the active sub-domain is determined to become inactive in the next computational step, allocating the at least one available hardware-based processing unit to other computational tasks.

2. The method according to claim 1, wherein the other computational task comprises a second portion of the wave modeling computation corresponding to another active sub-domain different from the active sub-domain.

3. The method according to claim 2, further comprising:
   executing the second portion of the wave modeling computation at a higher computational resolution than the resolution at which the first portion of the wave modeling computation was executed.

4. The method according to claim 1, further comprising:
   assigning all hardware-based processing units available for the wave modeling computation to only active sub-domains;
   scheduling use of the hardware-based processing units according to available slots in a schedule, wherein the first portion of the wave modeling computation is executed according to the schedule; and wherein the determining of which sub-domains of the plurality of sub-domains are active is based on results from a previously executed portion of the wave modeling computation.

5. The method according to claim 1, wherein the determining of whether the active sub-domain will remain active in a next computational step is based on detecting whether any wave amplitude in the active sub-domain is above a given threshold.

6. The method according to claim 1, further comprising:
   determining whether a neighboring sub-domain will become active in the next computational step, and when the neighboring sub-domain is determined to become active in the next computational step, allocating the at least one available hardware-based processing unit to the neighboring sub-domain.

7. The method according to claim 6, wherein the determining of whether a neighboring sub-domain will become active in the next computational step is applied only on inactive neighboring sub-domains.

8. The method according to claim 1, wherein each sub-domain includes a plurality of nodes, each node comprising a wave amplitude, and wherein each sub-domain includes a group of ghost nodes having wave amplitudes obtained from boundary nodes in an adjacent sub-domain when a wave amplitude of the boundary nodes is larger than a predetermined threshold.

9. The method according to claim 8, wherein the boundary nodes comprise a two node wide boundary of the nearest nodes in the adjacent sub-domain, and wherein the ghost nodes have the same coordinates in the computational domain as the boundary nodes of the adjacent sub-domain from which the wave amplitudes are obtained.

10. The method according to claim 8, further comprising:
    obtaining wave amplitudes to a first subset of the ghost nodes from boundary nodes in a first orthogonally adjacent sub-domain;
    obtaining wave amplitudes to a second subset of the ghost nodes from boundary nodes in a second orthogonally adjacent sub-domain, wherein the first and second subsets are different, and wherein the first and second orthogonally adjacent sub-domains are opposite to each other.

11. The method according to claim 10, wherein the obtaining of wave amplitudes to the second subset immediately follows the obtaining of wave amplitudes to the first subset.

12. The method according to claim 10, further comprising:
    obtaining wave amplitudes to a third subset of the ghost nodes from boundary nodes in a third orthogonally adjacent sub-domain;
    obtaining wave amplitudes to a fourth subset of the ghost nodes from boundary nodes in a fourth orthogonally adjacent sub-domain, wherein the first, second, third and fourth subsets are different, and wherein the third and fourth orthogonally adjacent sub-domains are opposite to each other and diagonally adjacent to the first and second orthogonally adjacent sub-domains.

13. The method according to claim 12, wherein sub-domains are orthogonally adjacent if they share one edge and diagonally adjacent if they share one corner.

14. The method according to claim 13, further comprising:
obtaining wave amplitudes to a fifth subset of the ghost nodes from boundary nodes in a fifth orthogonally adjacent sub-domain;
obtaining wave amplitudes to a sixth subset of the ghost nodes from boundary nodes in a sixth orthogonally adjacent sub-domain, wherein the first, second, third, fourth, fifth and sixth subsets are different, and wherein the fifth and sixth orthogonally adjacent sub-domains are opposite to each other and diagonally adjacent to the first, second, third and fourth orthogonally adjacent sub-domains.

15. The method according to claim 14, wherein sub-domains are orthogonally adjacent if they share one surface and diagonally adjacent if they share one edge.

16. The method according to claim 1, wherein a quantity of the plurality of sub-domains is determined by the dividing based on a quantity and capability of the hardware-based processing units.

17. The method according to claim 1, wherein a quantity of the plurality of sub-domains is determined by the dividing based on a desired computational resolution.

18. The method according to claim 1, wherein a quantity of the plurality of sub-domains is greater than a quantity of hardware-based processing units.

19. An apparatus for allocating hardware-based processing units for a wave modeling computation, comprising:
circuitry configured to
generate a computational domain representing a physical region in which wave amplitudes for physical waves are determined,
divide the domain into a plurality of sub-domains,
determine which sub-domains of the plurality of sub-domains are active,
for a computational step of a plurality of computational steps and in each active sub-domain of the plurality of active sub-domains, execute a first portion of the wave modeling computation corresponding to the active sub-domain by at least one available hardware-based processing unit and determine whether the active sub-domain will remain active in a next computational step of the plurality of computational steps, and
when the active sub-domain is determined to become inactive in the next computational step, allocate the at least one available hardware-based processing unit to other computational tasks.

20. A non-transitory computer readable medium storing thereon instructions that when executed by a computer cause the computer to execute a method for allocating hardware-based processing units for a wave modeling computation, the method comprising:
generating a computational domain representing a physical region in which wave amplitudes for physical waves are determined;
dividing the domain into a plurality of sub-domains;
determining which sub-domains of the plurality of sub-domains are active;
for a computational step of a plurality of computational steps and in each active sub-domain of the plurality of active sub-domains, executing a first portion of the wave modeling computation corresponding to the active sub-domain by at least one available hardware-based processing unit and determining whether the active sub-domain will remain active in a next computational step of the plurality of computational steps, and
when the active sub-domain is determined to become inactive in the next computational step, allocating the at least one available hardware-based processing unit to other computational tasks.

* * * * *